US011602906B2

(12) United States Patent
Usui et al.

(10) Patent No.: US 11,602,906 B2
(45) Date of Patent: Mar. 14, 2023

(54) MANUFACTURING DEVICE FOR MANUFACTURING TUBULAR MEMBER CONSTITUTING HIGH-PRESSURE TANK

(71) Applicant: TOYOTA JIDOSHA KABUSHIKI KAISHA, Toyota (JP)

(72) Inventors: Takashi Usui, Toyota (JP); Toshikazu Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 138 days.

(21) Appl. No.: 17/378,086

(22) Filed: Jul. 16, 2021

(65) Prior Publication Data

US 2022/0080679 A1 Mar. 17, 2022

(30) Foreign Application Priority Data

Sep. 17, 2020 (JP) .............................. JP2020-156656

(51) Int. Cl.
*B29C 70/32* (2006.01)
*B29L 31/00* (2006.01)

(52) U.S. Cl.
CPC ....... *B29C 70/32* (2013.01); *B29L 2031/7156* (2013.01)

(58) Field of Classification Search
CPC .................................................. B29C 70/32
See application file for complete search history.

(56) References Cited

U.S. PATENT DOCUMENTS 4,233,020 A    11/1980   Oswald

FOREIGN PATENT DOCUMENTS

| CN | 104476777 A |   | 4/2015 |
|----|-------------|---|--------|
| DE | 2 259 690 |   | 6/1974 |
| JP | 2019-044937 A |   | 3/2019 |
| JP | 2020-138343 A | * | 9/2020 |
| RU | 2290310 C2 | * | 4/2006 |
| WO | WO 2008/152103 A2 |   | 12/2008 |

* cited by examiner

*Primary Examiner* — Jeffry H Aftergut
(74) *Attorney, Agent, or Firm* — Finnegan, Henderson, Farabow, Garrett & Dunner, LLP

(57) ABSTRACT

A mandrel has an outer peripheral member that shapes an outer peripheral surface of a mandrel, and a regulation member that regulates movement of the outer peripheral surface toward the radially inner side. A manufacturing device for a tubular member includes a radial movement mechanism that deforms the outer peripheral surface by actuating the regulation member into the outer peripheral surface in a winding shape and the outer peripheral surface in a separable shape, the separable shape being obtained by moving the outer peripheral surface in the winding shape toward the radially inner side and allowing the mandrel and the tubular member to be separated in the axial direction of the mandrel.

6 Claims, 12 Drawing Sheets

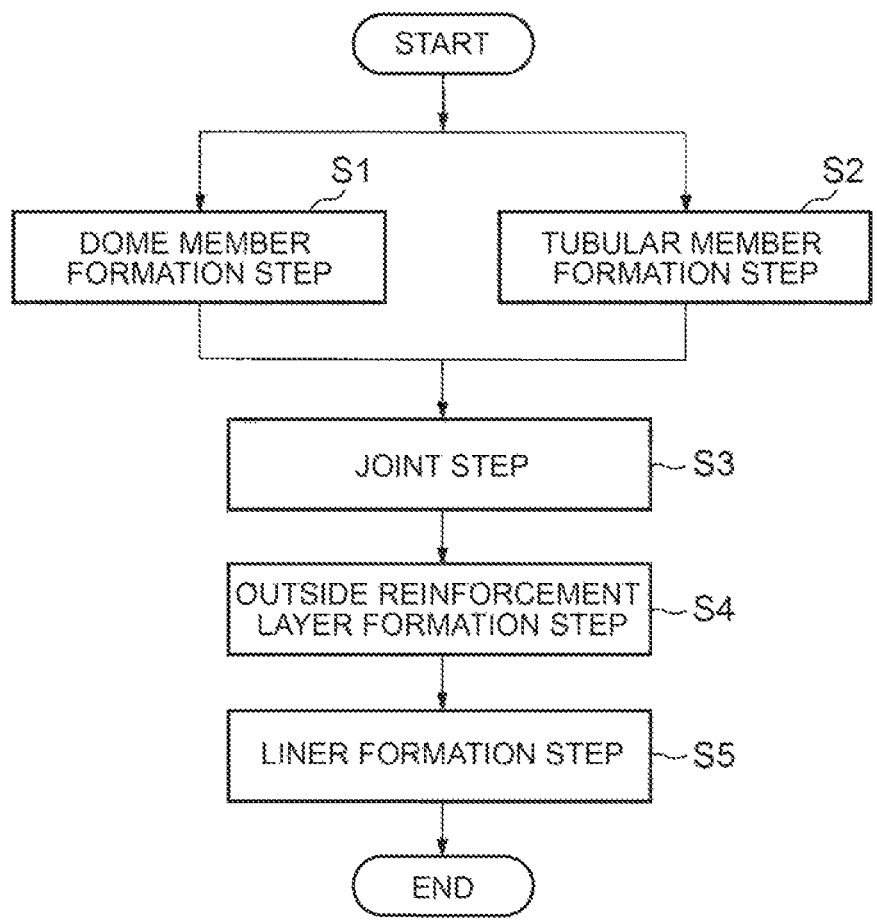
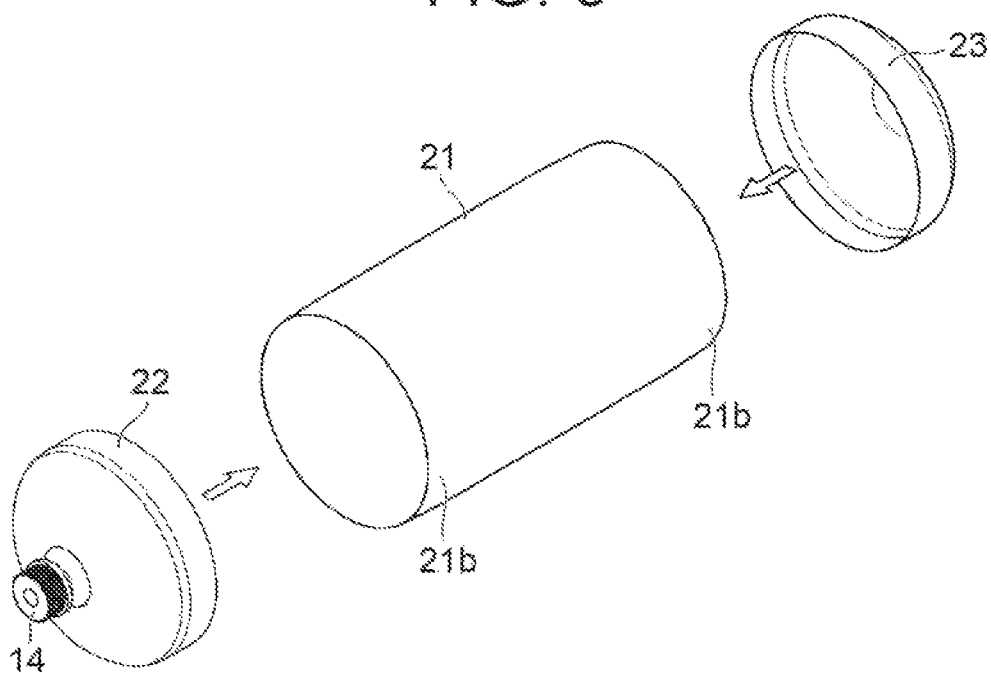

FIG. 7
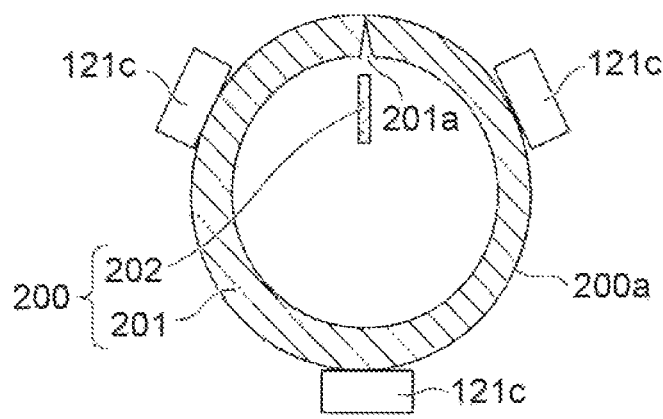
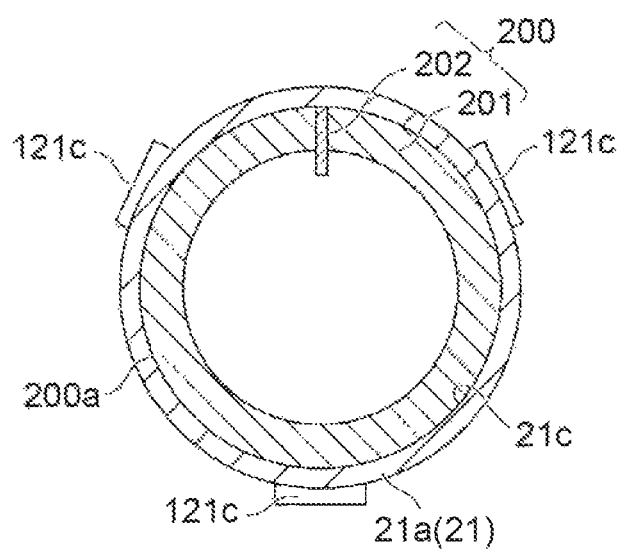
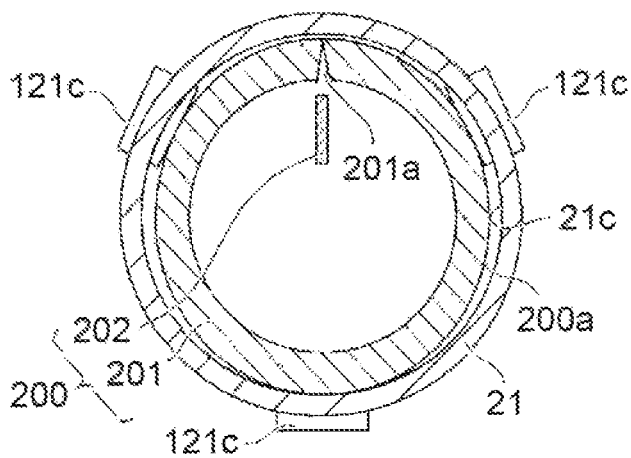

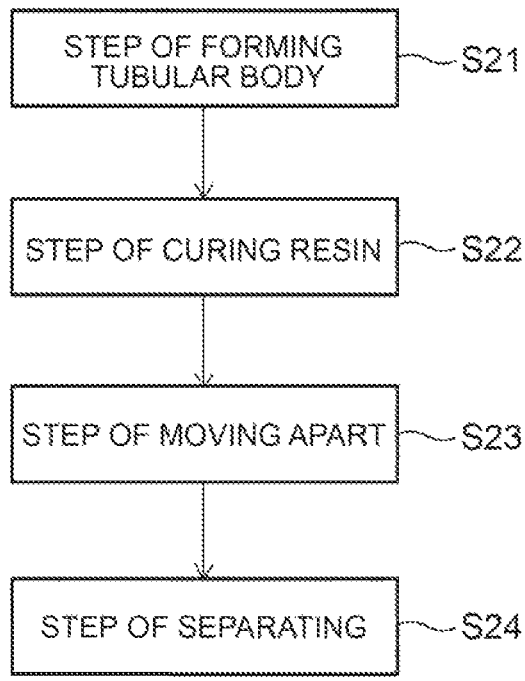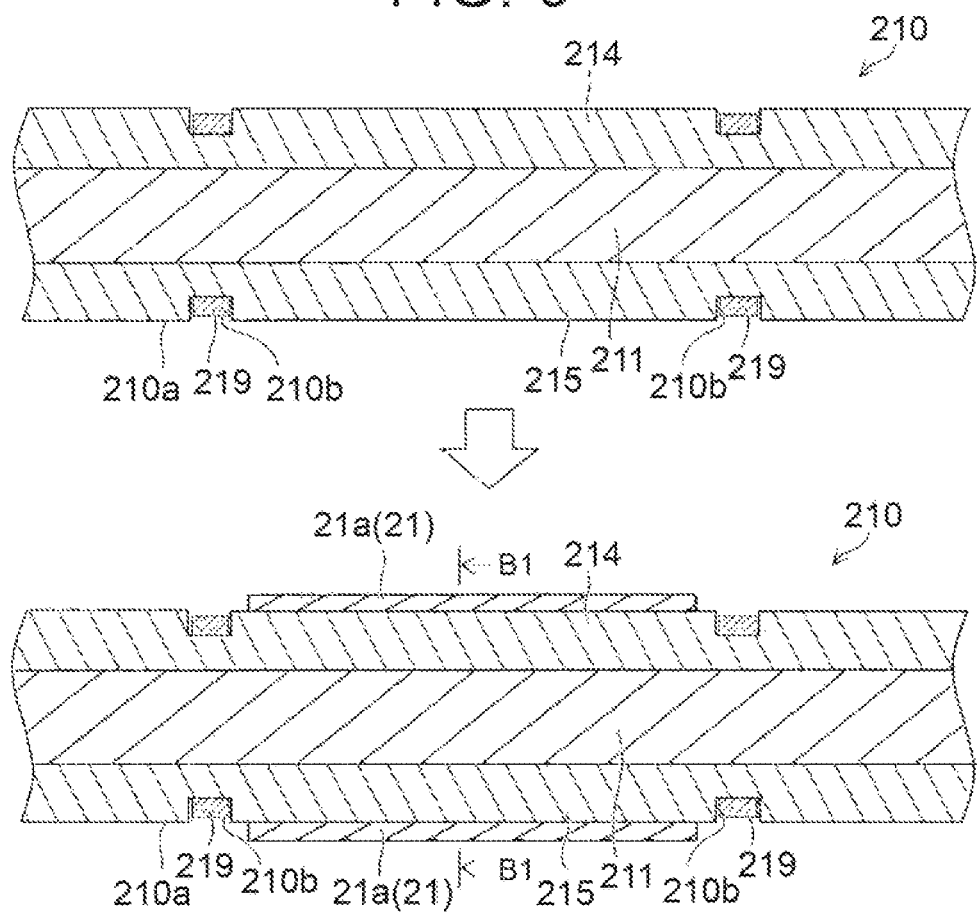

FIG. 11
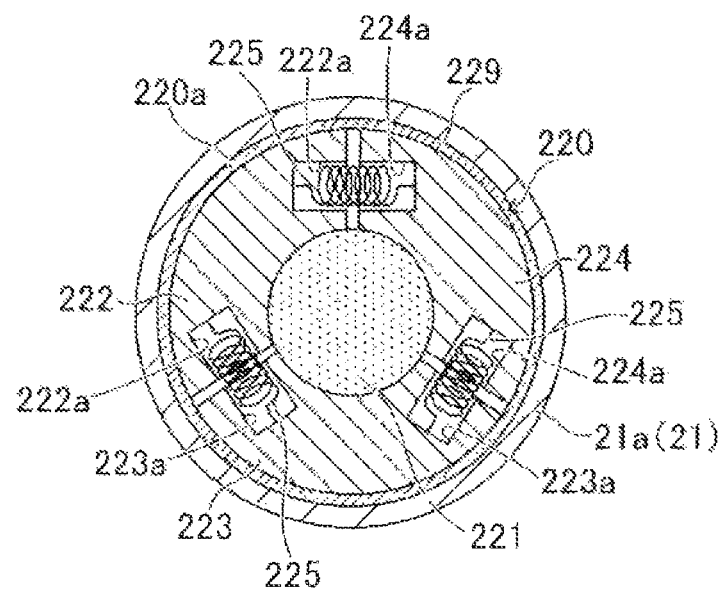
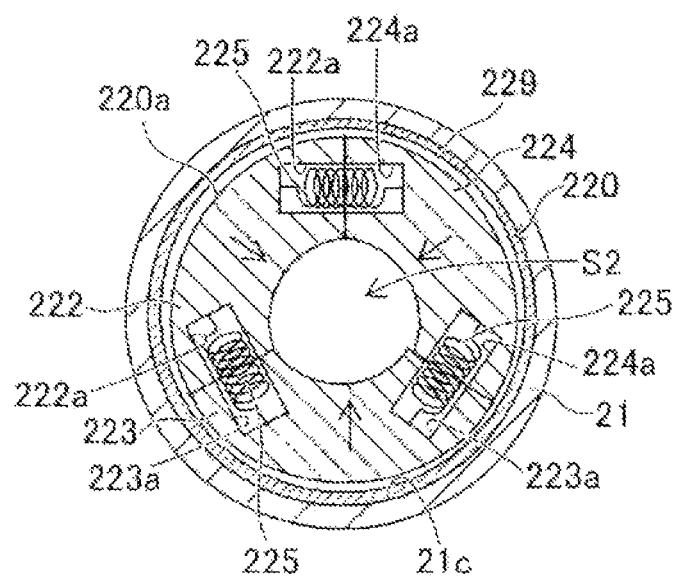

FIG. 15
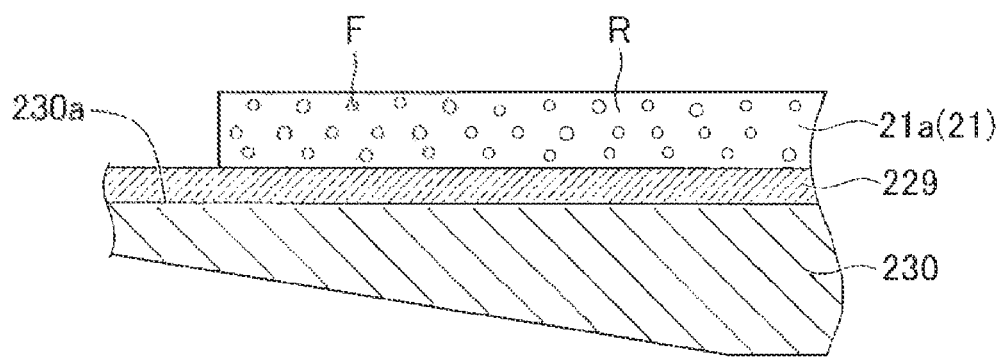
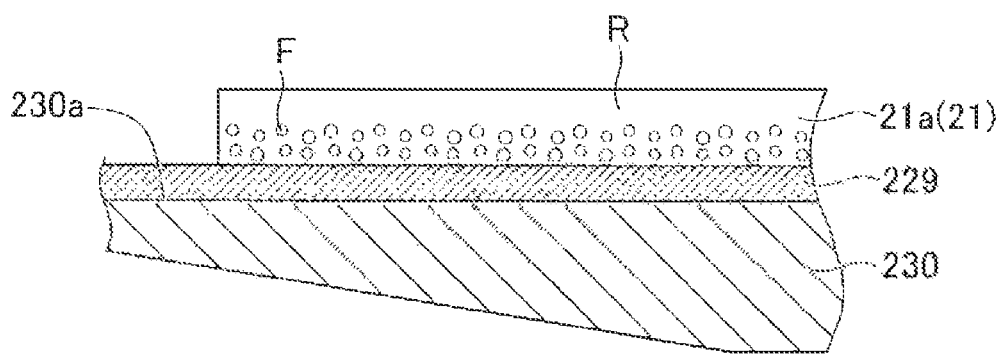

MANUFACTURING DEVICE FOR MANUFACTURING TUBULAR MEMBER CONSTITUTING HIGH-PRESSURE TANK

CROSS-REFERENCE TO RELATED APPLICATION

This application claims priority to Japanese Patent Application No. 2020-156656 filed on Sep. 17, 2020, incorporated herein by reference in its entirety.

BACKGROUND

1. Technical Field

The present disclosure relates to a manufacturing device that manufactures a tubular member of a reinforcement layer in a high-pressure tank that houses a gas, the reinforcement layer being made of a fiber-reinforced resin.

2. Description of Related Art

A tank that includes a tank body and an end fitting attached to an opening end portion of the tank body in the longitudinal direction is known as a high-pressure tank for use to store and supply hydrogen etc. The tank body includes a liner for tightly retaining a hydrogen gas and a reinforcement layer that reinforces the outer surface of the liner by winding a fiber bundle that is made of a fiber-reinforced resin.

A method of fabricating a reinforcement layer that is made of a fiber-reinforced resin by winding a fiber bundle around the outer surface of a liner by a filament winding method (hereinafter also referred to simply as an "FW method") and curing the fiber bundle, for example, is known as a method of manufacturing the high-pressure tank. For example, Japanese Unexamined Patent Application Publication No. 2019-44937 discloses a high-pressure tank that includes a liner and a reinforcement layer that covers the outer surface of the liner. The reinforcement layer includes a helical layer obtained by helically winding a fiber bundle impregnated with a resin around the outer surface of the liner, and a hoop layer obtained by hoop winding of a fiber bundle impregnated with a resin so as to cover the outer surface of the helical layer.

SUMMARY

A manufacturing method that includes fabricating a tubular member made of a fiber-reinforced resin and a pair of dome members made of a fiber-reinforced resin and fabricating a reinforcement layer by joining the dome members to respective ends of the tubular member is conceivable as a manufacturing method that replaces the method of manufacturing the high-pressure tank describes above.

To fabricate a tubular member made of a fiber-reinforced resin, however, it is necessary to shape a tubular member that is made of an uncured fiber-reinforced resin by winding a fiber bundle impregnated with a resin around the outer peripheral surface of a mandrel in a cylindrical shape or a circular column shape, for example, cure the uncured fiber-reinforced resin, and thereafter remove the tubular member from the mandrel.

To wind a fiber bundle impregnated with a resin around the outer peripheral surface of a mandrel, the fiber bundle is wound with a tension applied thereto. Therefore, the tubular member is pressed against the outer peripheral surface of the mandrel. Thus, relative slipping is caused between the outer peripheral surface of the mandrel and the inner peripheral surface of the tubular member when extracting the mandrel from the tubular member. This may cause a scratch on the inner peripheral surface of the tubular member.

An aspect of the present disclosure provides a manufacturing device capable of suppressing occurrence of a scratch on the inner peripheral surface of a tubular member of a high-pressure tank.

An aspect of the present disclosure relates to a manufacturing device for a tubular member corresponding to a reinforcement layer of a body portion of a high-pressure tank configured to house a gas, the manufacturing device manufacturing the tubular member from a fiber-reinforced resin. The manufacturing device includes: a mandrel that extends along a predetermined axis; a rotation device configured to hold an end portion of the mandrel and rotate the mandrel about the predetermined axis; a fiber supply device configured to supply a fiber bundle that is impregnated with a resin such that the fiber bundle is wound around the mandrel that is rotated by the rotation device; and a solidification device configured to shape the tubular member by solidifying the resin with which the fiber bundle wound around the mandrel is impregnated. The mandrel has at least one outer peripheral member that shapes an outer peripheral surface of the mandrel and that makes the outer peripheral surface freely deformable, and a regulation member that regulates movement of the outer peripheral surface toward a radially inner side. The manufacturing device further includes a deformation device configured to actuate the regulation member to deform the outer peripheral surface of the mandrel into the outer peripheral surface in a winding shape, the winding shape allowing winding of the fiber bundle, and the outer peripheral surface in a separable shape, the separable shape being obtained by moving the outer peripheral surface in the winding shape toward the radially inner side and allowing the mandrel and the tubular member to be separated in an axial direction of the mandrel, and a separation device configured to separate, in the axial direction, the tubular member and the mandrel having the outer peripheral surface that has been deformed to be in the separable shape.

With the manufacturing device according to the aspect described above, the fiber bundle is wound around the mandrel by supplying the fiber bundle from the fiber supply device to the mandrel while the rotation device is rotating the mandrel, the outer peripheral surface of which has been brought into the winding shape by the deformation device. At this time, the regulation member regulates the movement of the outer peripheral surface toward the radially inner side, and therefore the outer peripheral surface is kept in the winding shape. Then, the tubular member is shaped on the outer peripheral surface of the mandrel by the solidification device solidifying the resin with which the fiber bundle wound around the mandrel is impregnated. After that, a gap is provided between the outer peripheral surface of the mandrel and the inner peripheral surface of the tubular member by the deformation device actuating the regulation member to move the outer peripheral surface toward the radially inner side. In this state, the separation device separates the mandrel and the tubular member from each other by moving the mandrel and the tubular member relative to each other in the axial direction. Therefore, contact between the outer peripheral surface of the mandrel and the inner peripheral surface of the tubular member can be suppressed. Therefore, occurrence of a scratch on the inner peripheral surface of the tubular member can be suppressed.

In the manufacturing device described above, the outer peripheral member may be a cylindrical body in which a slit that extends in the axial direction is provided; the regulation member may be a shim that is able to be inserted into and extracted from the slit; the shim may regulate the movement of the outer peripheral surface toward the radially inner side and the outer peripheral surface may be in the winding shape when the shim is inserted in the slit by the deformation device; and the outer peripheral surface may be in the separable shape when the shim is extracted from the slit by the deformation device. With such a configuration, when winding the fiber bundle around the mandrel, the movement of the outer peripheral surface toward the radially inner side is regulated by the deformation device inserting the shim into the slit of the outer peripheral member. Thus, the fiber bundle can be wound with the outer peripheral surface kept in the winding shape. When separating the mandrel and the tubular member from each other by moving the mandrel and the tubular member relative to each other in the axial direction, meanwhile, the outer peripheral surface is moved to the radially inner side to be brought into the separable shape by the deformation device extracting the shim from the slit of the outer peripheral member. Thus, contact between the outer peripheral surface of the mandrel and the inner peripheral surface of the tubular member can be suppressed. The outer peripheral member is a cylindrical body in which the slit that extends in the axial direction is provided. Therefore, the shim can be extracted from the slit by the deformation device moving the shim toward the radially inner side. That is, the outer peripheral surface can be changed into the winding shape and the separable shape by moving the shim in the radial direction. Therefore, the distance of movement of the shim can be shortened compared to a case where the shim is moved in the axial direction to change the outer peripheral surface into the winding shape and the separable shape. Thus, the outer peripheral surface can be easily changed into the winding shape and the separable shape.

In the manufacturing device described above, the regulation member may be a core material that extends in the axial direction; the outer peripheral member may include a plurality of outer peripheral bodies disposed around the core material to shape the outer peripheral surface; the core material may be shaped to be able to be inserted into and extracted from a space provided inside by combining the outer peripheral bodies; and the core material may regulate the movement of the outer peripheral surface toward the radially inner side and the outer peripheral surface may be in the winding shape when the core material is inserted in the space by the deformation device, and the outer peripheral surface may be in the separable shape when the core material is extracted from the space by the deformation device. With such a configuration, when winding the fiber bundle around the mandrel, the movement of the outer peripheral surface toward the radially inner side is regulated by the deformation device inserting the core material into the space. Thus, the fiber bundle can be wound with the outer peripheral surface kept in the winding shape. When separating the mandrel and the tubular member from each other by moving the mandrel and the tubular member relative to each other in the axial direction, meanwhile, the outer peripheral surface can be brought into the separable shape, by the deformation device extracting the core material from the space to make the outer peripheral surface movable to the radially inner side. Thus, contact between the outer peripheral surface of the mandrel and the inner peripheral surface of the tubular member can be suppressed. The outer peripheral surface can be changed into the winding shape and the separable shape by inserting and extracting the core material into and from the space that is provided inside by combining the outer peripheral bodies. Therefore, movement of the plurality of outer peripheral bodies can be regulated easily using a single core material, by the deformation device moving the single core material in the axial direction to be inserted into the space when the outer peripheral surface is brought into the winding shape, for example.

In the manufacturing device described above, the mandrel may further have a shaft that extends in the axial direction; the outer peripheral member may include a plurality of outer peripheral bodies disposed around the shaft to shape the outer peripheral surface; each of a pair of the regulation members may be provided on each of both sides of the outer peripheral bodies in the axial direction; the regulation members may each include a movement member disposed between the shaft and the outer peripheral bodies to move in the axial direction along the shaft; the movement member may have an inclined surface inclined with respect to the axial direction; the outer peripheral bodies may have a sliding surface that is inclined with respect to the axial direction and that slides with respect to the inclined surface of the movement member; the outer peripheral member may be provided with a first biasing member that biases the outer peripheral bodies such that the outer peripheral surface is displaced toward the radially inner side with the inclined surface of the movement member in abutment with the sliding surface; a pair of the movement members may regulate the movement of the outer peripheral surface toward the radially inner side and the outer peripheral surface may be in the winding shape when the movement members are disposed at a predetermined position along the axial direction of the mandrel by the deformation device; and the outer peripheral surface may be in the separable shape when the movement members are moved from the predetermined position away from each other along the axial direction of the mandrel by the deformation device. In this manner, the movement member has an inclined surface inclined with respect to the axial direction, and the outer peripheral bodies have a sliding surface that slides with respect to the inclined surface of the movement member. Thus, the sliding surface of the outer peripheral bodies slides with respect to the inclined surface of the movement member when the deformation device moves the movement member along the axial direction. At this time, the first biasing member biases the outer peripheral bodies such that the outer peripheral surface is displaced toward the radially inner side. Thus, the outer peripheral surface is brought into the separable shape with the outer peripheral bodies moved toward the radially inner side by the biasing force of the first biasing member, by the deformation device moving the movement members away from each other. Meanwhile, the outer peripheral surface is brought into the winding shape with the outer peripheral bodies moved toward the radially outer side against the biasing force of the first biasing member, by the deformation device moving the movement members closer to each other. Consequently, the outer peripheral surface can be easily changed into the winding shape and the separable shape by the deformation device moving the movement members.

In this case, the regulation members may further include a second biasing member that biases the movement members in a direction of moving closer to each other along the axial direction of the mandrel when the first biasing member biases the outer peripheral bodies; and the second biasing member may be configured to bias the movement members such that the second biasing member is compressively elastically deformable along the axial direction of the mandrel by a winding tightening force of the fiber bundle generated when the fiber bundle is wound around the mandrel. When the resin with which the fiber bundle is impregnated is a thermosetting resin, the resin is temporarily softened by heat when curing an uncured thermosetting resin. At this time, the fiber bundle is wound with a tension applied thereto, and therefore moved toward the radially inner side (toward the mandrel) in the resin as the resin is softened. Consequently, the fiber bundle is occasionally loosened with the tension of the fiber bundle reduced. In the manufacturing device, however, the second biasing member biases the movement members such that the second biasing member is compressively elastically deformable along the axial direction of the mandrel by a winding tightening force of the fiber bundle. That is, the outer peripheral surface is displaced toward the radially inner side when the fiber bundle is wound around the mandrel. Since a biasing force in the direction of moving closer to each other acts on the movement members because of the second biasing member, a force toward the radially outer side acts on the outer peripheral bodies. Therefore, the outer peripheral bodies are displaced toward the radially outer side by an amount corresponding to the reduction in the tension of the fiber bundle, that is, by an amount corresponding to movement of the fiber bundle toward the radially inner side, as the resin is softened. Consequently, loosening of the fiber bundle due to the reduction in the tension of the fiber bundle is suppressed, and thus a reduction in the strength of the fiber-reinforced resin can be suppressed.

In the manufacturing device described above, a gap may be provided between the outer peripheral bodies when the outer peripheral surface is in the winding shape; and a sleeve to which the fiber bundle is supplied from the fiber supply device may be provided so as to cover the outer peripheral surface of the mandrel. With such a configuration, even if a gap is provided between the outer peripheral bodies when the outer peripheral surface is brought into the winding shape using the deformation device (i.e. during winding of the fiber bundle), the gap is covered by the sleeve, and thus entry of an uncured resin into the gap can be suppressed when the fiber bundle is wound using the fiber supply device. Consequently, formation of bumps and pits etc. on the inner peripheral surface of the tubular member can be suppressed.

With the aspect of the present disclosure, it is possible to provide a manufacturing device for a tubular member, the manufacturing device being capable of suppressing occurrence of a scratch on the inner peripheral surface of the tubular member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating a method of manufacturing the high-pressure tank according to the first embodiment of the present disclosure;

FIG. 3 is a perspective view illustrating a joint step in FIG. 2;

FIG. 7 is a cross-sectional view illustrating the manufacturing device and the manufacturing method for the tubular member according to the first embodiment of the present disclosure;

FIG. 8 is a flowchart illustrating a tubular member formation step in FIG. 2;

FIG. 9 is a sectional view illustrating a manufacturing device and a manufacturing method for a tubular member according to a second embodiment of the present disclosure;

FIG. 11 is a cross-sectional view illustrating a manufacturing device and a manufacturing method for a tubular member according to a third embodiment of the present disclosure;

FIG. 15 is a sectional view illustrating an effect of using the manufacturing device according to the fourth embodiment of the present disclosure.

DETAILED DESCRIPTION OF EMBODIMENTS

First Embodiment

A manufacturing device 100 that manufactures a tubular member 21 according to a first embodiment of the present disclosure will be described below with reference to the drawings. Before that, a configuration of a high-pressure tank 10 that has the tubular member 21 will be described briefly. In the following, the high-pressure tank 10 is described as a tank to be charged with a high-pressure hydrogen gas and mounted on a fuel-cell vehicle. However, the high-pressure tank 10 may be applied to other purposes. The gas that can be charged into the high-pressure tank 10 is not limited to a high-pressure hydrogen gas.

Figure 1:
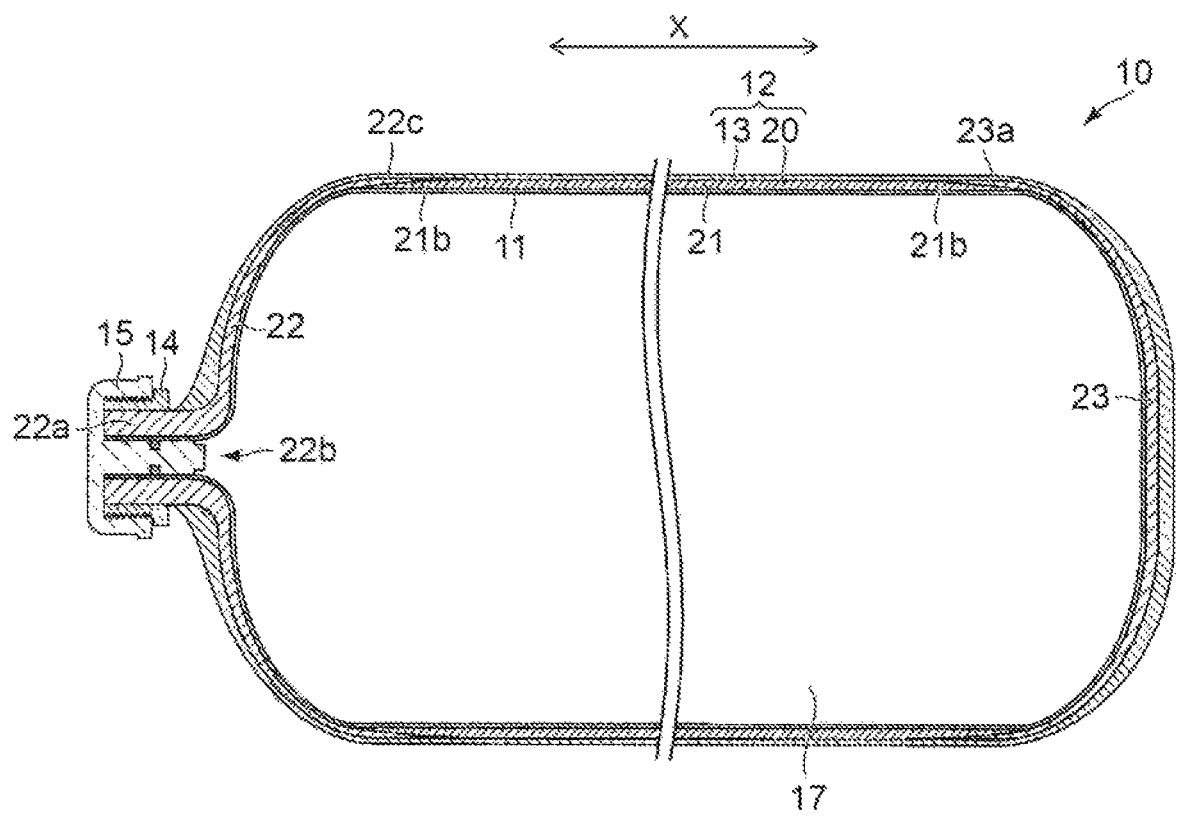
FIG. 1 is a sectional view illustrating a structure of a high-pressure tank fabricated using a manufacturing device according to a first embodiment of the present disclosure.

As illustrated in FIG. 1, the high-pressure tank 10 is a high-pressure gas storage container in which a dome-shaped portion is provided at both ends of a tubular body portion. The high-pressure tank 10 includes a liner 11 that has gas barrier properties, and a fiber-reinforced resin layer 12 made of a fiber-reinforced resin that covers the outer surface of the liner 11. The fiber-reinforced resin layer 12 has a reinforcement body 20 that serves as a reinforcement layer that covers the outer surface of the liner 11, and an outside reinforcement layer 13 that covers the outer surface of the reinforcement body 20. An opening portion is formed at one end of the high-pressure tank 10. An end fitting 14 is attached around the opening portion. No opening portion is formed or no end fitting is provided at the other end of the high-pressure tank 10.

The liner 11 is formed along the inner surface of the reinforcement body 20. The liner 11 is a member that is made of a resin and that forms a housing space 17 to be charged with a high-pressure hydrogen gas. The resin that constitutes the liner 11 is preferably a resin that has performance to retain a gas to be charged (here, a hydrogen gas) in the housing space 17, that is, good gas barrier properties. Examples of such a resin include thermoplastic resins such as polyamide, polyethylene, ethylene-vinyl alcohol copolymer resin (EVOH), and polyester, and thermosetting resins such as epoxy. The liner 11 may be charged with a fuel gas other than the hydrogen gas, such as compressed gases such as a compressed natural gas (CNG), liquefied gases such as a liquefied natural gas (LNG) and a liquefied petroleum gas (LPG), and other gases.

The end fitting 14 is formed by processing a metal material such as aluminum and an aluminum alloy into a predetermined shape. A valve 15 is attached to the end fitting 14 to allow the hydrogen gas to be charged into and discharged from the housing space 17.

The reinforcement body 20 covers the outer surface of the liner 11, and has a function of reinforcing the liner 11 to improve the mechanical strength of the high-pressure tank 10 such as rigidity and pressure tightness. As discussed later, the reinforcement body 20 has the tubular member 21 in a cylindrical shape and a pair of dome members 22 and 23, which are integrated with each other. The dome members 22 and 23 are connected to opposite ends of the tubular member 21.

The outside reinforcement layer 13 is formed so as to cover the outer surface of the reinforcement body 20. The outside reinforcement layer 13 is constituted from a resin and a fiber bundle (continuous fibers). The fiber bundle suppresses movement of the dome members 22 and 23 toward the axially outer side, and suppresses detachment of the dome members 22 and 23 from the tubular member 21 toward the axially outer side because of a gas pressure.

Next, a method of manufacturing the high-pressure tank 10 according to the first embodiment of the present disclosure will be described. FIG. 2 is a flowchart illustrating the method of manufacturing the high-pressure tank 10. As illustrated in FIG. 2, the method of manufacturing the high-pressure tank 10 includes a dome member formation step S1, a tubular member formation step S2, a joint step S3, an outside reinforcement layer formation step S4, and a liner formation step S5. The dome member formation step S1 and the tubular member formation step S2 are mutually independent steps. Therefore, such steps may be performed concurrently, or one of the steps may be performed prior to the other.

In the dome member formation step S1, a pair of dome members 22 and 23 that is made of a fiber-reinforced resin is formed. The dome members 22 and 23 can be formed by pasting (or winding) a fiber bundle impregnated with a resin to (or around) a form that has a dome-shaped surface and curing the fiber bundle, or through injection molding, for example. At this time, a cylindrical projecting portion 22a that has a through hole 22b is formed on the dome member 22. An end fitting 14 is attached to the outer surface of the projecting portion 22a of the dome member 22.

The resin with which the fiber bundle is impregnated is not specifically limited, and may be a thermosetting resin, for example. The thermosetting resin is preferably a phenol resin, a melamine resin, a urea resin, an epoxy resin, etc. Use of an epoxy resin is particularly preferable from the viewpoint of mechanical strength etc. In general, the epoxy resin is a resin obtained by mixing a prepolymer such as a copolymer of bisphenol-A and epichlorohydrin and a curing agent such as polyamine, and curing the mixture by heat. The epoxy resin has fluidity before being cured, and forms a tenacious cross-linked structure after being cured by heat. The resin with which the fiber bundle is impregnated may also be a thermoplastic resin. The thermoplastic resin may be polyether ether ketone, polyphenylene sulfide, polyacrylic acid ester, polyimide, polyamide, etc.

The fibers that constitute the fiber bundle may be glass fibers, aramid fibers, boron fibers, carbon fibers, etc. Use of carbon fibers is particularly preferable from the viewpoint of lightweight properties, mechanical strength, etc.

In the tubular member formation step S2, a tubular member 21 that is made of a fiber-reinforced resin is formed using the manufacturing device 100 to be discussed later. The manufacturing device 100 and the tubular member formation step S2 for manufacturing the tubular member 21 will be discussed in detail later.

In the joint step S3, as illustrated in FIG. 3, peripheral edge portions 21b at both ends of the tubular member 21 and peripheral edge portions 22c and 23a (see FIG. 1) of the dome members 22 and 23 are joined to each other to form a reinforcement body 20 that serves as a reinforcement layer.

Specifically, the peripheral edge portions 21b of the tubular member 21, and the peripheral edge portions 22c and 23a of the dome members 22 and 23 are fitted with each other with either (here, the peripheral edge portions 21b) the peripheral edge portions 21b or the peripheral edge portions 22c and 23a placed inside and the other (here, the peripheral edge portions 22c and 23a) placed outside. At this time, an adhesive (not illustrated) may be disposed between the tubular member 21, and the dome members 22 and 23. With such a configuration, separation between the tubular member 21, and the dome members 22 and 23 can be suppressed better in the subsequent steps. The material of the adhesive (not illustrated) is not specifically limited. Use of a thermosetting resin such as an epoxy resin is preferable, for example.

In the outside reinforcement layer formation step S4, an outside reinforcement layer 13 in which a fiber bundle is disposed to extend between the dome members 22 and 23 is formed from a fiber-reinforced resin so as to cover the outer surface of the reinforcement body 20. Consequently, a fiber-reinforced resin layer 12 that has the reinforcement body 20 and the outside reinforcement layer 13 is formed. For example, the outside reinforcement layer 13 may be formed by helically winding the fiber bundle that is impregnated with a resin around the outer surface of the reinforcement body 20. Alternatively, the outside reinforcement layer 13 may be formed by pasting a plurality of fiber bundles that is impregnated with a resin to the outer surface of the reinforcement body 20 with the fiber bundles extending in an axial direction X of the reinforcement body 20, or the outside reinforcement layer 13 may be formed using a so-called sheet-winding method, in which a fiber sheet woven from fiber bundles that are impregnated with a resin is wound around the outer surface of the reinforcement body 20.

The resin with which the fiber bundle is impregnated is not specifically limited, and may be a resin that is similar to that for the tubular member 21 and the dome member 22. The fibers that constitute the fiber bundle are also not specifically limited, and may be fibers that are similar to those for the tubular member 21 and the dome member 22.

Figure 4:
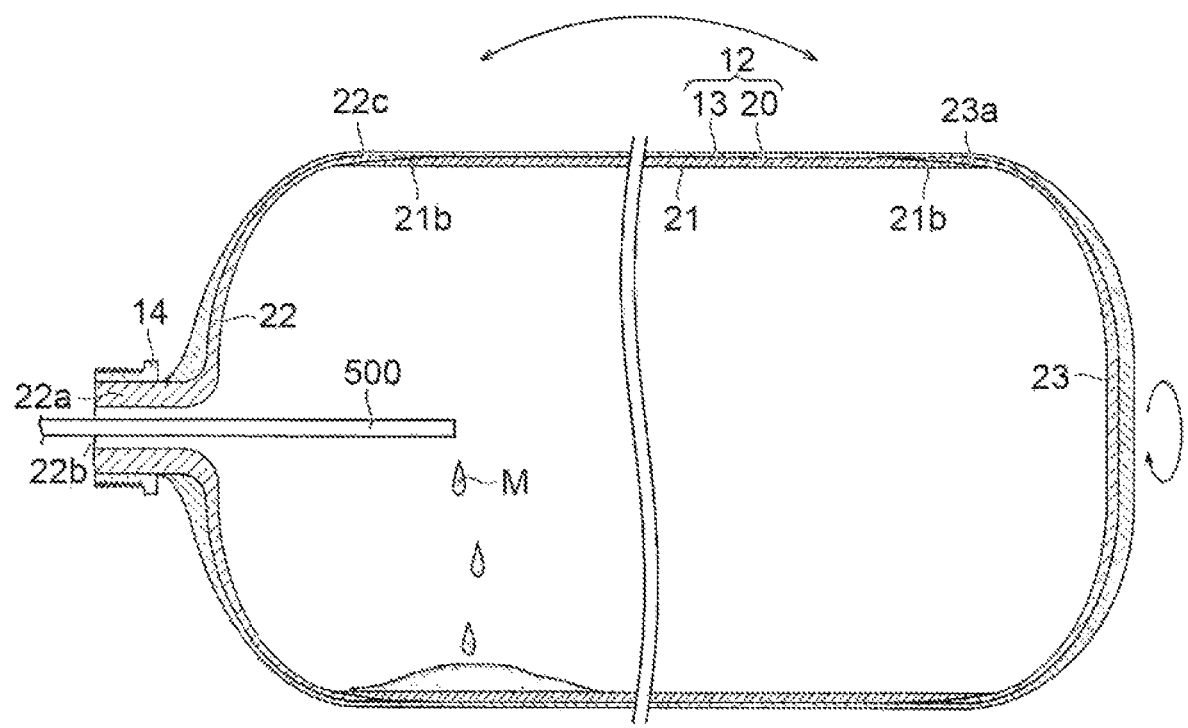
FIG. 4 is a sectional view illustrating a liner formation step in FIG. 2.

In the liner formation step S5, as illustrated in FIG. 4, a resin material M is inserted via the through hole 22b that is formed in the projecting portion 22a of the reinforcement body 20. Then, the liner 11 is formed by solidifying the resin material M while rotating the fiber-reinforced resin layer 12.

Specifically, the through hole 22b communicates between the internal space and the external space of the fiber-reinforced resin layer 12. A nozzle 500 that discharges the resin material M is inserted into the through hole 22b to inject the resin material M into the internal space of the fiber-reinforced resin layer 12. Then, the nozzle 500 is extracted from the through hole 22b.

As discussed above, the resin material M is preferably a resin with good gas barrier properties. Examples of such a resin include thermoplastic resins such as polyamide, polyethylene, ethylene-vinyl alcohol copolymer resin (EVOH), and polyester, and thermosetting resins such as epoxy. Use of polyamide is preferable.

After that, the internal space of the fiber-reinforced resin layer 12 is heated to a predetermined temperature or more as necessary, and the fiber-reinforced resin layer 12 is rotated in the circumferential direction about an axis along the horizontal direction and both ends of the fiber-reinforced resin layer 12 are raised and lowered alternately (see FIG. 4) with the resin material M having fluidity and low viscosity. Consequently, the resin material M having fluidity is raised by rotation of the fiber-reinforced resin layer 12 and a part of the resin material M flows down on the inner surface of the fiber-reinforced resin layer 12 because of its own weight so that the resin material M covers the entire inner surface of the reinforcement body 20. When the resin material M is a thermosetting resin, the liner 11 is formed by heating the internal space to cure the resin material M. When the resin material M is a thermoplastic resin, the liner 11 is formed by solidifying the resin material M with the resin material M contacting and covering the inner surface of the fiber-reinforced resin layer 12. Here, the liner 11 is formed by a reaction injection molding method using, as the resin material M, two or more types of liquid materials that have a low molecular weight and low viscosity and have fluidity at normal temperature. In this case, the liner 11 is formed by producing a polymer from a monomer by heating the internal space, and thereafter cooling the internal space to solidify the polymer.

With the liner formation step S5, the liner 11 can be easily formed inside the fiber-reinforced resin layer 12 even after the fiber-reinforced resin layer 12 is formed. A die for molding a liner is not required unlike a case where a liner is formed through injection molding using a die.

Then, the valve 15 is attached to the end fitting 14 to complete the high-pressure tank 10. Next, the manufacturing device 100 for manufacturing the tubular member 21 will be described.

Figure 5:
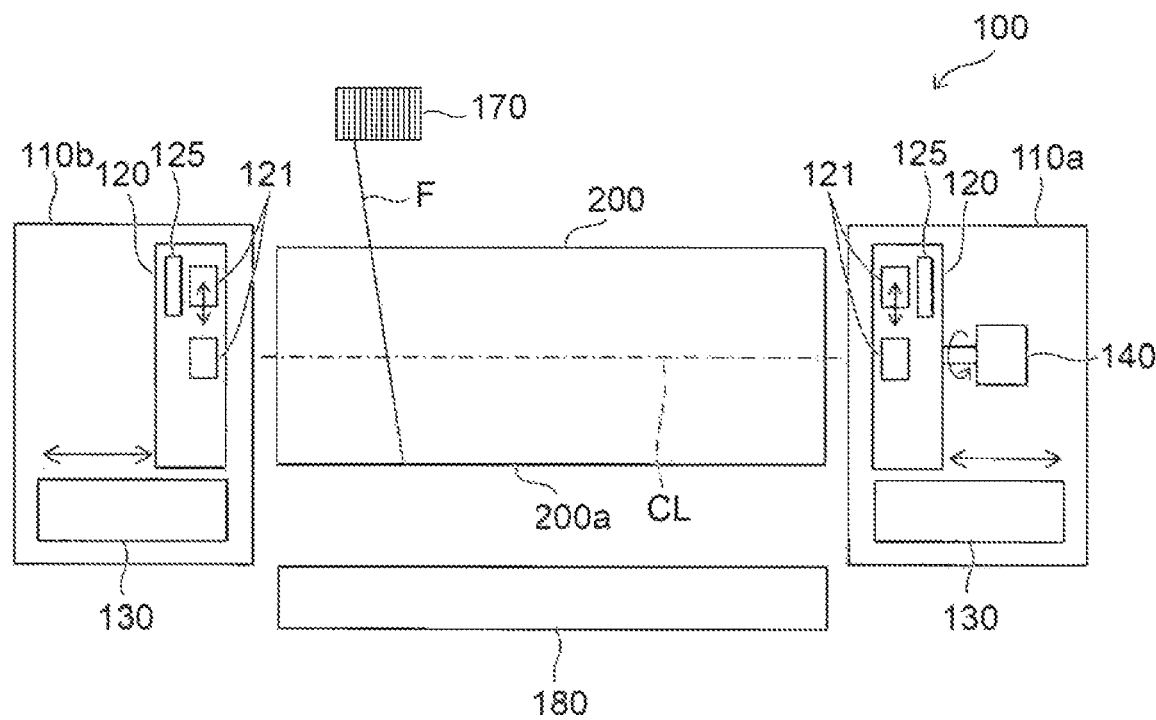
FIG. 5 is a schematic diagram illustrating a configuration of the manufacturing device according to the first embodiment of the present disclosure.

As illustrated in FIG. 5, the manufacturing device 100 includes a cylindrical mandrel 200, a pair of drive units 110a and 110b, a fiber supply device 170, and a heating device (solidification device) 180. The cylindrical mandrel 200 has an outer peripheral surface 200a on which the tubular member 21 is to be formed and that extends along a central axis (predetermined axis) CL. The drive units 110a and 110b are disposed on opposite sides of the mandrel 200 in the axial direction. The fiber supply device 170 supplies a fiber bundle F that is impregnated with a resin to the mandrel 200. The heating device (solidification device) 180 cures (solidifies) the resin with which the fiber bundle F wound around the mandrel 200 is impregnated.

Each of the drive units 110a and 110b includes a holding device 120 that holds the mandrel 200. At least one of the drive units 110a and 110b (here, both of the drive units 110a and 110b) includes a movement device (separation device) 130 that moves the holding device 120 in the axial direction of the mandrel 200. At least one of the drive units 110a and 110b (here, the drive unit 110a) includes a rotation device 140 that rotates the holding device 120 about the central axis CL together with the mandrel 200. Each holding device 120 is provided so as to be rotatable about the central axis CL.

Each holding device 120 includes one or more holding members 121 that hold a member that constitutes the mandrel 200. In the present embodiment, each holding device 120 includes two holding members 121. The holding members 121 are constituted from a plurality of lugs, arms, etc. for holding the member that constitutes the mandrel 200 therebetween, for example. Each holding device 120 is provided with a radial movement mechanism 125 that moves at least one (here, one) of the holding members 121 in the radial direction. The radial movement mechanism 125 is constituted from a rail that extends in the radial direction and a solenoid, a motor, etc., for example. In the present embodiment, the radial movement mechanism 125 is an example of the "deformation device" according to the present disclosure.

The movement device 130 is configured to be able to move the one or more holding members 121 together or independently in the axial direction of the mandrel 200. The movement device 130 is constituted from a rail that extends in the axial direction and a solenoid, a motor, etc., for example.

The rotation device 140 is constituted from a drive motor and a gear, a shaft, etc. that transfers a rotational drive force of the drive motor to the holding device 120, for example.

The heating device 180 is constituted from a heater and a fan that blows heat from the heater to the mandrel 200, for example.

Figure 6:
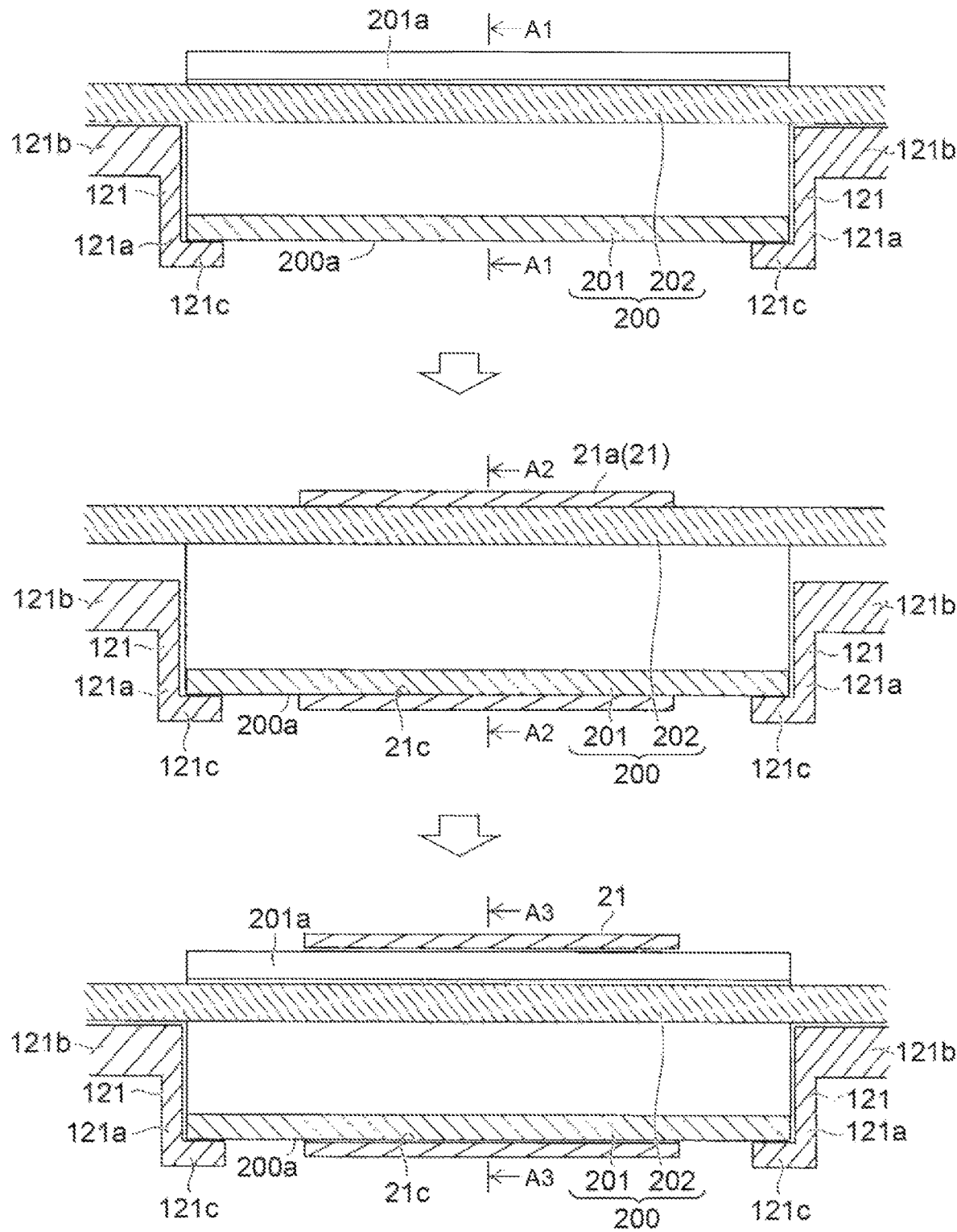
FIG. 6 is a sectional view illustrating a manufacturing device and a manufacturing method for a tubular member according to the first embodiment of the present disclosure.

As illustrated in FIGS. 6 and 7, the mandrel 200 has at least one (here, one) outer peripheral member 201 that constitutes the outer peripheral surface 200a of the mandrel 200 and that makes the outer peripheral surface 200a freely deformable, and a regulation member 202 that regulates movement of the outer peripheral surface 200a toward the radially inner side. In the present embodiment, the outer peripheral member 201 is a cylindrical body in which a slit 201a that extends in the axial direction is formed, and the regulation member 202 is a shim that is able to be inserted into and extracted from the slit 201a. The first, second, and third illustrations from the top of FIG. 7 are cross-sectional views taken along the A1-A1 line in the first illustration from the top of FIG. 6, the A2-A2 line in the second illustration of FIG. 6, and the A3-A3 line in the third illustration of FIG. 6, respectively. Hereinafter, when a plurality of illustrations is included in a single drawing as in FIGS. 6 and 7, for example, the first illustration from the top of the drawing, the second illustration from the top, . . . will be referred to simply as the first, second, . . . illustrations, respectively, of the drawing in order to simplify description of the drawings.

Both ends of the outer peripheral member 201 are held by the holding members 121. The holding members 121 each have a support body 121a, a shaft portion 121b that extends in the axial direction of the mandrel 200, and a plurality of lugs 121c that holds the outer peripheral member 201 therebetween. The lugs 121c are configured to operate about a predetermined axis so as to hold the outer peripheral member 201 therebetween, although not described in detail here. Therefore the lugs 121c can hold an end portion of the outer peripheral member 201 irrespective of whether the outer peripheral surface 200a is in a winding shape or a separable shape to be discussed later.

The regulation member 202 is formed so as to extend along the axial direction of the mandrel 200. Both ends of the regulation member 202 are held by the holding members 121. The regulation member 202 is made movable in the radial direction of the outer peripheral member 201 by the radial movement mechanism 125. The regulation member 202 regulates movement of the outer peripheral surface 200a toward the radially inner side by regulating the width of the slit 201a from being narrowed with the regulation member 202 inserted in the slit 201a (the state in the second illustration of FIG. 7).

When the regulation member 202 is inserted in the slit 201a by the radial movement mechanism 125 (the state in the second illustration of FIG. 6 and the second illustration of FIG. 7), the outer peripheral surface 200a is in a winding shape for winding of the fiber bundle F. When the regulation member 202 is extracted from the slit 201a by the radial movement mechanism 125 (the state in the third illustration of FIG. 6 and the third illustration of FIG. 7), meanwhile, the outer peripheral surface 200a is moved to the radially inner side to be in a separable shape in which the mandrel 200 and the tubular member 21 can be separated from each other in the axial direction. That is, when the regulation member 202 is inserted into the slit 201a, the outer peripheral member 201 is elastically deformed from a no-load state (in which the regulation member 202 is not inserted in the slit 201a) (the state in the first illustration of FIG. 6 and the first illustration of FIG. 7) into a state in which the slit 201a is widened (the state in the second illustration of FIG. 6 and the second illustration of FIG. 7). When the regulation member 202 is extracted from the slit 201a, meanwhile, the outer peripheral member 201 is elastically deformed to return to the original state. In this manner, when winding the fiber bundle F around the mandrel 200, movement of the outer peripheral surface 200a toward the radially inner side is regulated by the radial movement mechanism 125 inserting the regulation member 202 into the slit 201a of the outer peripheral member 201. Thus, the fiber bundle F can be wound with the outer peripheral surface 200a kept in the winding shape. When separating the mandrel 200 and the tubular member 21 from each other by moving the mandrel 200 and the tubular member 21 relative to each other in the axial direction, meanwhile, the outer peripheral surface 200a is moved toward the radially inner side to be brought into the separable shape by the radial movement mechanism 125 extracting the regulation member 202 from the slit 201a of the outer peripheral member 201. Thus, contact between the outer peripheral surface 200a of the mandrel 200 and an inner peripheral surface 21c of the tubular member 21 can be suppressed. The outer peripheral member 201 is a cylindrical body in which the slit 201a that extends in the axial direction is formed. Therefore, the regulation member 202 can be extracted from the slit 201a by the radial movement mechanism 125 moving the regulation member 202 toward the radially inner side. That is, the outer peripheral surface 200a can be changed into the winding shape and the separable shape by moving the regulation member 202 in the radial direction. Therefore, the distance of movement of the regulation member 202 can be shortened compared to a case where the regulation member 202 is moved in the axial direction to change the outer peripheral surface 200a into the winding shape and the separable shape. Thus, the outer peripheral surface 200a can be easily changed into the winding shape and the separable shape.

When the regulation member 202 is inserted in the slit 201a and the outer peripheral surface 200a is in the winding shape, the outer peripheral surface of the outer peripheral member 201 and the outer peripheral surface of the regulation member 202 are flush with each other. That is, no step due to the slit 201a is formed on the outer peripheral surface 200a of the mandrel 200.

The material of the outer peripheral member 201 is not specifically limited. However, the material is preferably metal in order to secure such strength that the outer peripheral member 201 is not deformed when the fiber bundle F that is impregnated with a resin is wound around the outer peripheral member 201. The material of the regulation member 202 is not specifically limited. However, the material is preferably metal in order to secure such strength that the regulation member 202 is not deformed when inserted into the slit 201a.

Next, the tubular member formation step S2 will be described.

In the tubular member formation step S2, as illustrated in FIGS. 6 and 7, a tubular body 21a to form the tubular member 21 is formed by a filament winding method in which the fiber bundle F is wound around the outer peripheral surface 200a of the mandrel 200 that is cylindrical and rotated by the rotation device 140. The tubular body 21a to form the tubular member 21 may be formed by a so-called sheet winding method in which a fiber sheet is wound around the outer peripheral surface 200a of the mandrel 200 that is rotated.

In the present embodiment, as illustrated in FIG. 8, the tubular member formation step S2 includes: a step S21 of forming a tubular body 21a that is made of an uncured fiber-reinforced resin by winding the fiber bundle F impregnated with a resin around the outer peripheral surface 200a of the mandrel 200; a step S22 of forming a tubular member 21 (making the tubular body 21a into a tubular member 21) by curing the uncured fiber-reinforced resin; a step S23 of moving the outer peripheral surface 200a of the mandrel 200 apart from the inner peripheral surface 21c of the tubular member 21 by moving the outer peripheral surface 200a of the mandrel 200 toward the radially inner side; and a step S24 of separating the tubular member 21 and the mandrel 200 from each other by moving the tubular member 21 and the mandrel 200 relative to each other in the axial direction. The resin with which the fiber bundle F (or the fiber sheet) is impregnated is not specifically limited, and may be a resin that is similar to that for the dome member 22. In the present embodiment, a thermosetting resin is used. The fibers that constitute the fiber bundle F (or the fiber sheet) are not specifically limited, and may be fibers that are similar to those for the dome member 22.

In the tubular member formation step S2, in step S21, a fiber bundle F impregnated with a resin is supplied to a predetermined region of the outer peripheral surface 200a of the mandrel 200 while rotating the holding members 121 and the mandrel 200 at a predetermined rotational speed when the regulation member 202 is inserted in the slit 201a of the outer peripheral member 201 and the outer peripheral surface 200a is in the winding shape (the state in the second illustration of FIG. 6 and the second illustration of FIG. 7). Consequently, the fiber bundle F is wound around the outer peripheral surface 200a of the mandrel 200 to form the tubular body 21a that is made of an uncured fiber-reinforced resin.

After that, in step S22, hot air is blown toward the tubular body 21*a* by the heating device 180, and the tubular member 21 is formed by curing the uncured fiber-reinforced resin with which the fiber bundle F is impregnated.

Then, in step S23, the regulation member 202 is extracted from the slit 201*a* by moving the regulation member 202 toward the radially inner side of the mandrel 200 as illustrated in the third illustration of FIG. 6 and the third illustration of FIG. 7. Consequently, the outer peripheral surface 200*a* of the mandrel 200 is moved toward the radially inner side, the outer peripheral surface 200*a* is moved apart from the inner peripheral surface 21*c* of the tubular member 21, and a gap is formed between the outer peripheral surface 200*a* of the mandrel 200 and the inner peripheral surface 21*c* of the tubular member 21. The manufacturing device 100 is provided with a tubular member holding device (not illustrated) that holds the tubular member 21.

After that, in step S24, the tubular member 21 and the mandrel 200 are separated from each other in the axial direction by the movement device 130 of the drive unit 110*a* moving the mandrel 200 (the outer peripheral member 201 and the regulation member 202) in the axial direction. At this time, the holding of the mandrel 200 by the holding device 120 of the drive unit 110*b* is canceled. The tubular member formation step S2 is ended in this manner.

In the present embodiment, as described above, the fiber bundle F is wound around the mandrel 200 by supplying the fiber bundle F from the fiber supply device 170 to the mandrel 200 while the rotation device 140 is rotating the mandrel 200, the outer peripheral surface 200*a* of which has been brought into the winding shape by the radial movement mechanism 125. At this time, the regulation member 202 regulates movement of the outer peripheral surface 200*a* toward the radially inner side, and therefore the outer peripheral surface 200*a* is kept in the winding shape. Then, the tubular member 21 is formed on the outer peripheral surface 200*a* of the mandrel 200 by the heating device 180 solidifying the resin with which the fiber bundle F wound around the mandrel 200 is impregnated. After that, a gap is formed between the outer peripheral surface 200*a* of the mandrel 200 and the inner peripheral surface 21*c* of the tubular member 21 by the radial movement mechanism 125 actuating the regulation member 202 to move the outer peripheral surface 200*a* toward the radially inner side. In this state, the movement device 130 separates the mandrel 200 and the tubular member 21 from each other by moving the mandrel 200 and the tubular member 21 relative to each other in the axial direction. Therefore, contact between the outer peripheral surface 200*a* of the mandrel 200 and the inner peripheral surface 21*c* of the tubular member 21 can be suppressed. Therefore, occurrence of a scratch on the inner peripheral surface 21*c* of the tubular member 21 can be suppressed.

Second Embodiment

Figure 10:
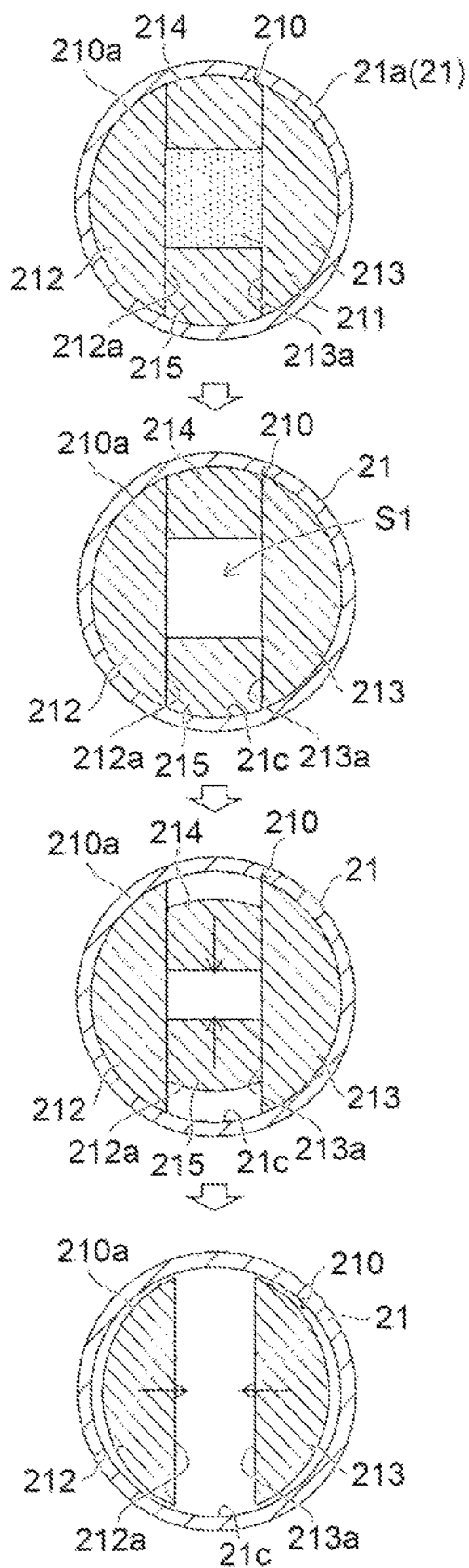
FIG. 10 is a cross-sectional view illustrating the manufacturing device and the manufacturing method for the tubular member according to the second embodiment of the present disclosure.

In a second embodiment, as illustrated in FIGS. 9 and 10, a mandrel 210 is formed from a plurality of (here, five) divided bodies including a regulation member 211 that is formed from a core material that extends in the axial direction, and a plurality of (here, four) outer peripheral bodies (outer peripheral members) 212, 213, 214, and 215 disposed around the regulation member 211 to form an outer peripheral surface 210*a*, unlike the first embodiment described above. Both ends of the regulation member 211 and the outer peripheral bodies 212 to 215 are held by the holding members 121. The regulation member 211 and the outer peripheral bodies 212 to 215 are independently movable in the axial direction by the movement device 130. The first illustration of FIG. 10 is a cross-sectional view taken along the B1-B1 line in the second illustration of FIG. 9.

The outer peripheral bodies 212 to 215 are configured to form a space S1 (see the second illustration of FIG. 10) inside when the outer peripheral bodies 212 to 215 are combined with each other. Here, the space S1 is formed in the shape of a rectangular parallelepiped that extends in the axial direction of the mandrel 210. That is, in the present embodiment, the outer peripheral bodies 212 to 215 form a cylinder that has the space S1 in the shape of a rectangular parallelepiped at the central portion. The regulation member 211 is formed in the shape of a rectangular parallelepiped of the same size as that of the space S1 that is formed when the outer peripheral bodies 212 to 215 are combined.

The outer peripheral bodies 212 and 213 are formed to have facing surfaces 212*a* and 213*a* disposed in parallel with each other with a predetermined clearance therebetween, and to have a generally semicircular cross-sectional surface. The outer peripheral bodies 214 and 215 are disposed between the outer peripheral bodies 212 and 213, and formed to be movable along the facing surfaces 212*a* and 213*a*.

As illustrated in FIG. 9, attachment grooves 210*b* for attachment of ring members 219 are formed to extend in the circumferential direction in a predetermined region (specifically, on both outer sides with respect to a region in which the tubular member 21 is to be formed) of the outer peripheral surface 210*a* of the mandrel 210. When the ring members 219 are attached to the attachment grooves 210*b*, the outer peripheral bodies 212 to 215 and the regulation member 211 tightly contact each other with the regulation member 211 inserted in the space S1 that is formed by the outer peripheral bodies 212 to 215, and the outer peripheral surface 210*a* of the mandrel 210 is brought into a perfect circle shape. The material of the ring members 219 is not specifically limited as long as the material has heat resistance to the curing temperature of the resin that constitutes the tubular member 21. For example, metal, heat-resistant rubber, etc. may be used.

The outer peripheral surface 210*a* is in the winding shape when the regulation member 211 is inserted in the space S1. In the present embodiment, as discussed later, when winding the fiber bundle F around the mandrel 210, movement of the outer peripheral surface 210*a* toward the radially inner side is regulated by the movement device 130 inserting the regulation member 211 into the space S1. Thus, the fiber bundle F can be wound with the outer peripheral surface 210*a* kept in the winding shape. When separating the mandrel 210 and the tubular member 21 from each other by moving the mandrel 210 and the tubular member 21 relative to each other in the axial direction, meanwhile, the outer peripheral surface 210*a* is made movable toward the radially inner side and can be brought into the separable shape by the movement device 130 extracting the regulation member 211 from the space S1. Thus, contact between the outer peripheral surface 210*a* of the mandrel 210 and the inner peripheral surface 21*c* of the tubular member 21 can be suppressed. The outer peripheral surface 210*a* can be changed into the winding shape and the separable shape by inserting and extracting the regulation member 211 into and from the space S1 that is formed inside by combining the outer peripheral bodies 212 to 215. Therefore, movement of the plurality of outer peripheral bodies 212 to 215 can be regulated easily using a single regulation member 211, by the movement device 130 moving the single regulation member 211 in the axial direction to be inserted into the space S1 when the outer peripheral surface 210a is brought into the winding shape, for example.

In the tubular member formation step S2 according to the present embodiment, in step S21, the outer peripheral surface 210a of the mandrel 210 is brought into the winding shape by inserting the regulation member 211 into the space S1 that is formed by combining the outer peripheral bodies 212 to 215. At this time, the regulation member 211 regulates movement of the outer peripheral surface 210a toward the radially inner side. In this state (the state in the first illustration of FIG. 9), the tubular body 21a is formed on the outer peripheral surface 210a of the mandrel 210 (see the state in the second illustration of FIG. 9 and the state in the first illustration of FIG. 10).

After that, in step S22, hot air is blown toward the tubular body 21a to cure the uncured fiber-reinforced resin to form the tubular member 21.

Then, in step S23, the outer peripheral bodies 214 and 215 are made movable toward the radially inner side by extracting the regulation member 211 in the axial direction (see the state in the second illustration of FIG. 10). After that, the outer peripheral bodies 214 and 215 are moved toward the radially inner side along the facing surfaces 212a and 213a of the outer peripheral bodies 212 and 213 (see the state in the third illustration of FIG. 10). Consequently, the outer peripheral bodies 214 and 215 are moved apart from the inner peripheral surface 21c of the tubular member 21. When the movement device 130 of the drive unit 110a extracts the regulation member 211, the holding of the regulation member 211 by the holding member 121 of the drive unit 110b is canceled, and the regulation member 211 is extracted in a cantilever state. In the present embodiment, the movement device 130 is an example of the "deformation device" according to the present disclosure.

Then, the outer peripheral bodies 212 and 213 are made movable toward the radially inner side by extracting the outer peripheral bodies 214 and 215 in the axial direction. After that, the outer peripheral bodies 212 and 213 are moved toward the radially inner side (see the fourth illustration of FIG. 10). Consequently, a gap is formed between the outer peripheral surfaces of the outer peripheral bodies 212 and 213 and the inner peripheral surface 21c of the tubular member 21, and the outer peripheral surface 210a is brought into the separable shape. Also when the outer peripheral bodies 214 and 215 are extracted in the axial direction, the outer peripheral bodies 214 and 215 are extracted in a cantilever state, as with the regulation member 211.

Then, in step S24, the tubular member 21 and the outer peripheral bodies 212 and 213 are moved away from each other in the axial direction by moving the outer peripheral bodies 212 and 213 in the axial direction. Also when the outer peripheral bodies 212 and 213 are extracted in the axial direction, the outer peripheral bodies 212 and 213 are extracted in a cantilever state, as with the regulation member 211. The tubular member formation step S2 is ended in this manner.

The other structure, manufacturing method, and effect of the second embodiment are the same as those of the first embodiment described above.

Third Embodiment

In a third embodiment, as illustrated in FIG. 11, a gap is formed between outer peripheral bodies 222, 223, and 224, unlike the second embodiment described above.

In the third embodiment, a mandrel 220 is formed from a plurality of (here, four) divided bodies including a regulation member 221 that is formed from a core material that extends in the axial direction, and a plurality of (here, three) outer peripheral bodies (outer peripheral members) 222, 223, and 224 disposed around the regulation member 221 to form an outer peripheral surface 220a. The outer peripheral bodies 222 to 224 are formed to have a fan-shaped cross section, and configured to form a space S2 inside when the outer peripheral bodies 222 to 224 are combined with each other. Here, the space S2 is generally formed in the shape of a circular column that extends in the axial direction of the mandrel 220. The attachment grooves 210b for attachment of the ring members 219 are formed to extend in the circumferential direction in a predetermined region of the outer peripheral surface 220a of the mandrel 220, as in the second embodiment described above.

Here, in the present embodiment, the outer peripheral bodies 222 to 224 are provided with first biasing members 225 that bias the outer peripheral bodies 222 to 224 so as to displace the outer peripheral surface 220a toward the radially inner side. Specifically, recessed portions 222a, 223a, and 224a that house the first biasing members 225, which are extension coil springs, are formed in respective surfaces of the outer peripheral bodies 222 to 224 that are adjacent to each other in the circumferential direction. The outer peripheral bodies 222 to 224 are biased in the direction of moving closer to each other by the three first biasing members 225.

Each of the outer peripheral bodies 222 to 224 is biased toward the radially inner side by the resultant force of the two first biasing members 225. Consequently, the outer peripheral bodies 222 to 224 are brought into abutment with each other by the biasing forces of the first biasing members 225 when the outer peripheral bodies 222 to 224 are combined (see the second illustration of FIG. 11). The outer peripheral bodies 222 to 224 may be biased toward the radially inner side using heat-resistant rubber etc. as the ring members 219 described above, rather than providing the first biasing members 225. In this case, the ring members 219 made of heat-resistant rubber etc. function as the "first biasing member" according to the present disclosure.

The regulation member 221 is formed in the shape of a circular column, the outside diameter of which is slightly larger than the space S2 that is formed when the outer peripheral bodies 222 to 224 are combined. Therefore, when the regulation member 221 is inserted in the space S2 (the state in the first illustration of FIG. 11), the outer peripheral bodies 222 to 224 are moved slightly (e.g. by several millimeters) toward the radially outer side. At this time, a gap is formed between the outer peripheral bodies 222 to 224, and slit-like grooves (gaps) are formed in the outer peripheral surface 220a of the mandrel 220. At this time, the regulation member 221 regulates movement of the outer peripheral surface 220a toward the radially inner side.

In the present embodiment, a cylindrical sleeve 229 is provided on the outer peripheral surface 220a of the mandrel 220. Consequently, even if a gap is formed between the outer peripheral bodies 222 to 224 when the outer peripheral surface 220a is brought into the winding shape using the regulation member 221 (i.e. during winding of the fiber bundle F), the gap is covered by the sleeve 229, and thus entry of an uncured resin into the gap can be suppressed when the fiber bundle F is wound by the fiber supply device 170. Therefore, formation of bumps and pits etc. on the inner peripheral surface 21c of the tubular member 21 can be suppressed.

A gap is formed between an inside diameter of the sleeve 229 and the outer peripheral surfaces of the outer peripheral bodies 222 to 224 (the outer peripheral surface 220a of the mandrel 220) when the regulation member 221 is not inserted in the space S2. The sleeve 229 is formed so as to tightly contact the outer peripheral surfaces of the outer peripheral bodies 222 to 224 (the outer peripheral surface 220a of the mandrel 220) when the regulation member 221 is inserted in the space S2. For example, the sleeve 229 may have an inside diameter that is equal to the outside diameter of the mandrel 220 with the regulation member 221 inserted in the space S2 (with the outer peripheral surface 220a in the winding shape), or may be formed so as to be elastically deformable slightly (e.g. by several millimeters or less) in the radial direction. The material of the sleeve 229 is not specifically limited, and may be a thin, elastically deformable steel plate or resin, for example.

In the present embodiment, in step S21, as illustrated in the first illustration of FIG. 11, the tubular body 21a is formed on the outer peripheral surface of the sleeve 229 that covers the outer peripheral surface 220a of the mandrel 220 in a state in which the outer peripheral surface 220a of the mandrel 220 is brought into the winding shape by inserting the regulation member 221 into the space S2 that is formed by combining the outer peripheral bodies 222 to 224.

After that, in step S22, hot air is blown toward the tubular body 21a to cure the uncured fiber-reinforced resin to form the tubular member 21.

Then, in step S23, as illustrated in the second illustration of FIG. 11, the outer peripheral bodies 222 to 224 are moved toward the radially inner side by the function of the first biasing members 225, by the movement device 130 extracting the regulation member 221 in the axial direction. Consequently, the outer peripheral bodies 222 to 224 are moved apart from the inner peripheral surface of the sleeve 229, and the outer peripheral surface 220a is brought into the separable shape. In the present embodiment, the movement device 130 is an example of the "deformation device" according to the present disclosure.

After that, in step S24, the outer peripheral bodies 222 to 224 are extracted in the axial direction. In this state, the sleeve 229 tightly contacts the inner peripheral surface 21c of the tubular member 21.

Figure 12:
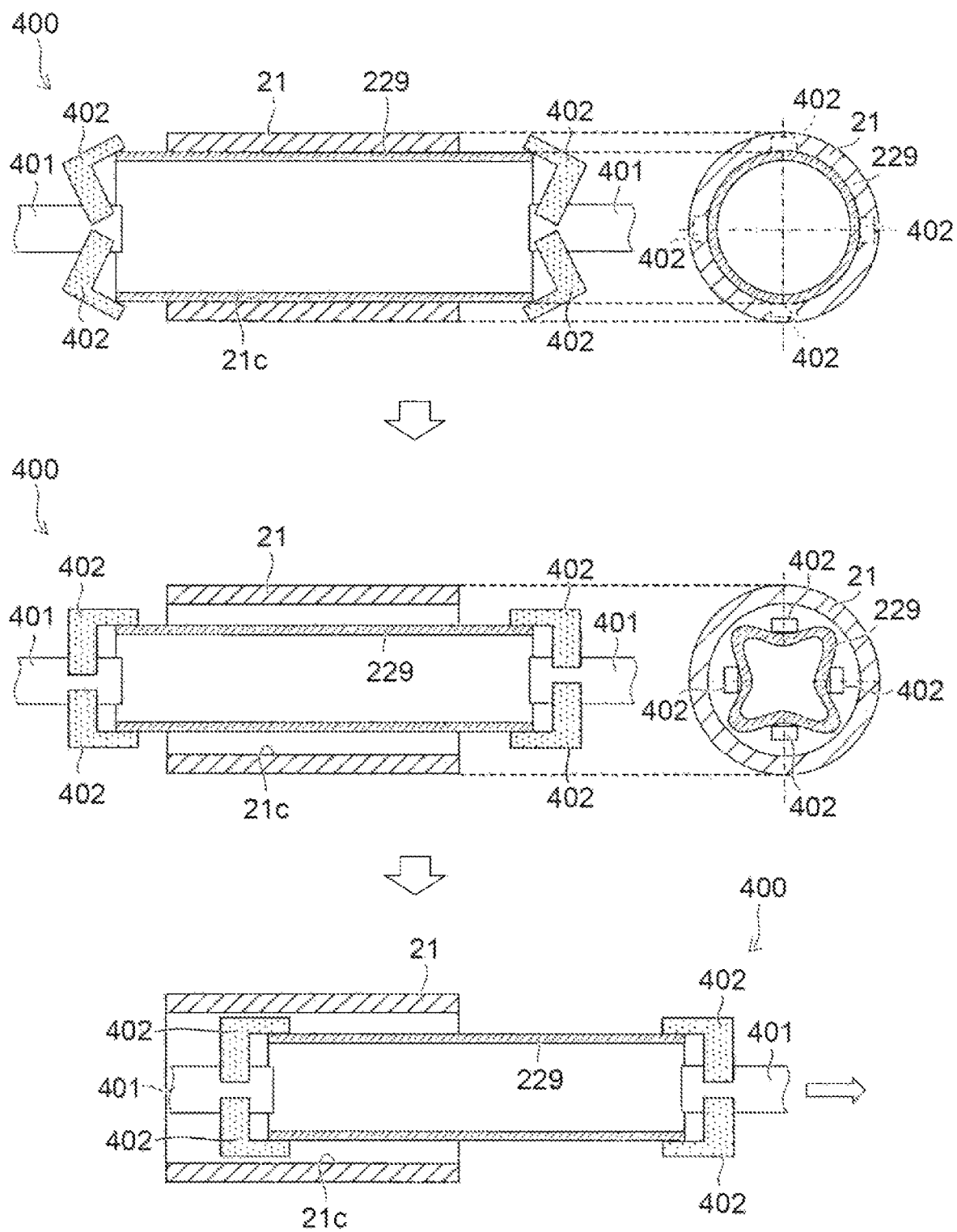
FIG. 12 is a sectional view and a cross-sectional view illustrating the manufacturing device and the manufacturing method for the tubular member according to the third embodiment of the present disclosure.

Thus, in the present embodiment, as illustrated in FIG. 12, the sleeve 229 is moved apart from the tubular member 21 using a sleeve extraction mechanism 400. Specifically, the sleeve extraction mechanism 400 includes a pair of arms 401 and a plurality of (here, four) lugs 402 provided on each of the arms 401. Each of the arms 401 is disposed at each of both end portions of the sleeve 229. The lugs 402 are configured to be turned by a predetermined angle with respect to the arm 401. The sleeve 229 is deformed toward the radially inner side by turning the lugs 402 from the state in the first illustration of FIG. 12 to the state in the second illustration of FIG. 12, which allows the sleeve 229 to be peeled from the tubular member 21. Then, the sleeve 229 is extracted by moving the arms 401 in the axial direction. The tubular member formation step S2 is ended in this manner. The sleeve extraction mechanism 400 is included in the manufacturing device 100, and actuated by the drive units 110a and 110b.

The other structure, manufacturing method, and effect of the third embodiment are the same as those of the second embodiment described above.

Fourth Embodiment

In a fourth embodiment, unlike the embodiments described above, an outer peripheral surface 230a of a mandrel 230 is displaced toward the radially outer side in step S22 in which an uncured fiber-reinforced resin is cured.

Figure 13:
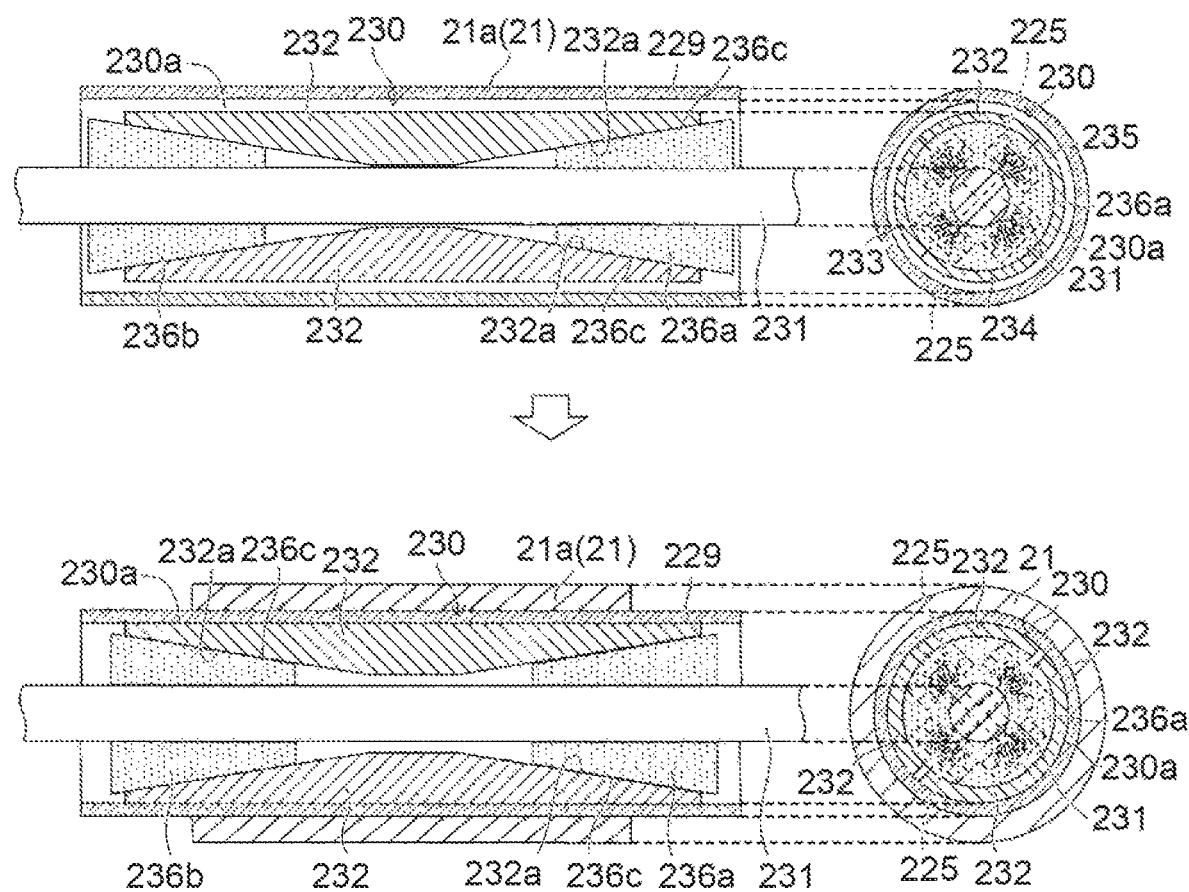
FIG. 13 is a sectional view and a cross-sectional view illustrating a manufacturing device and a manufacturing method for a tubular member according to a fourth embodiment of the present disclosure.

In the fourth embodiment, as illustrated in FIG. 13, the mandrel 230 has a shaft 231, a plurality of (here, four) outer peripheral bodies (outer peripheral members) 232 disposed around the shaft 231 to form the outer peripheral surface 230a, and a pair of regulation members 235a and 235b (see FIG. 14) disposed between the shaft 231 and the outer peripheral bodies 232 to regulate movement of the outer peripheral surface 230a toward the radially inner side. The regulation members 235a and 235b are provided on opposite sides of the outer peripheral bodies 232 in the axial direction. In the right illustrations of FIG. 13 in which the mandrel 230 is illustrated as seen in the axial direction, the members are hatched in order to facilitate understanding.

Both ends of the shaft 231 are held by the holding members 121.

As in the third embodiment described above, the outer peripheral bodies 232 are provided with the first biasing members 225 that bias the outer peripheral bodies 232 such that the outer peripheral surface 230a is displaced toward the radially inner side with inclined surfaces 236c of movement members 236a and 236b, to be discussed later, in abutment with sliding surfaces 232a, to be discussed later, of the outer peripheral bodies 232 (see the right illustration of FIG. 13). The attachment grooves 210b for attachment of the ring members 219 are formed to extend in the circumferential direction in a predetermined region of the outer peripheral surfaces of the outer peripheral bodies 232 (the outer peripheral surface 230a of the mandrel 230), as in the third embodiment described above. The sleeve 229 is provided on the outer peripheral surfaces of the outer peripheral bodies 232, as in the third embodiment described above.

Here, in the present embodiment, the outer peripheral bodies 232 are formed so as to become thinner toward both sides in the axial direction. Specifically, the sliding surfaces 232a that are inclined with respect to the axial direction are formed on portions of the inner surface (a surface that faces the shaft 231) of the outer peripheral bodies 232 on both sides in the axial direction.

Figure 14:
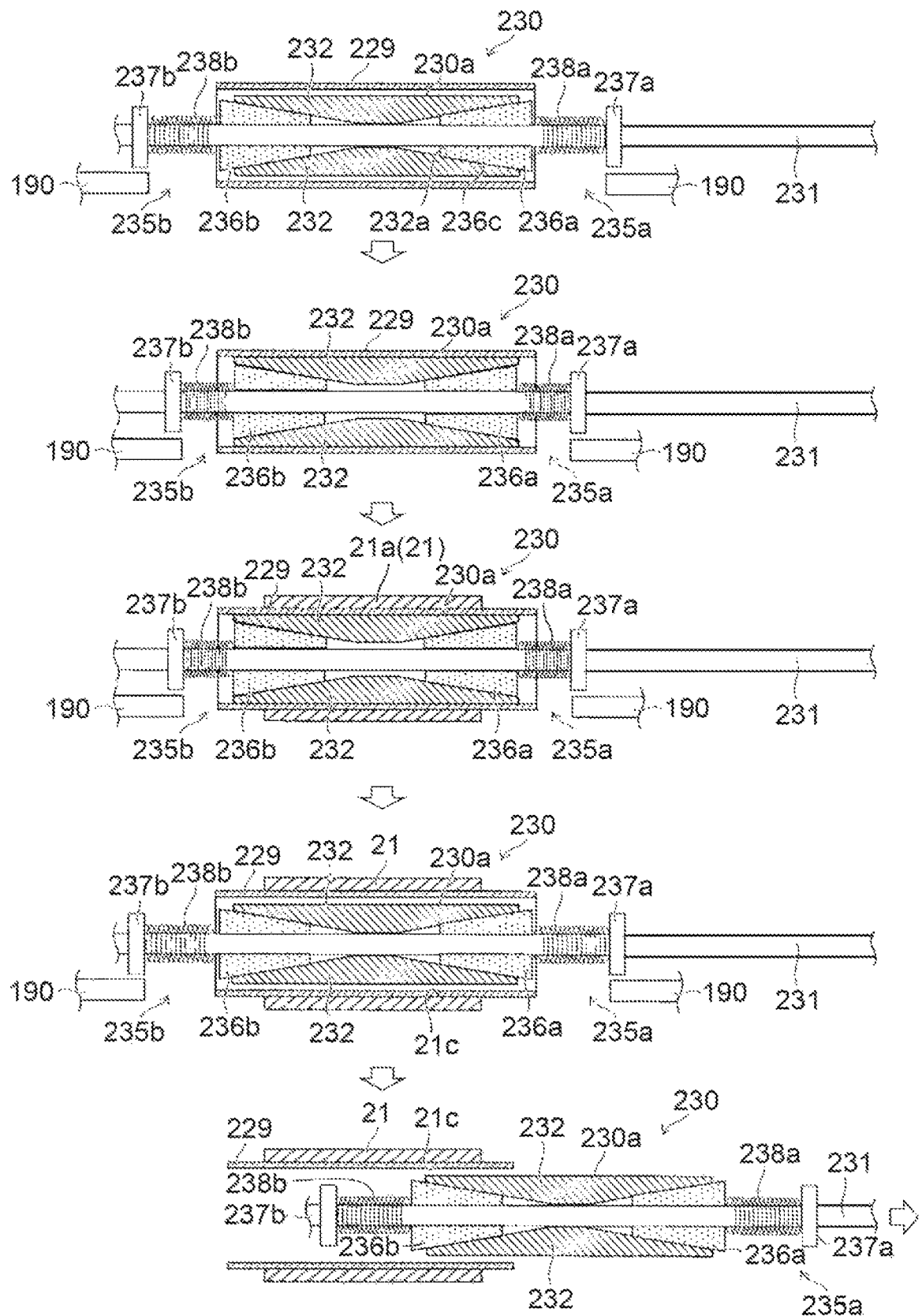
FIG. 14 is a sectional view illustrating the manufacturing device and the manufacturing method for the tubular member according to the fourth embodiment of the present disclosure.

As illustrated in FIG. 14, the regulation member 235a includes the movement member 236a that is disposed between the shaft 231 and the outer peripheral bodies 232 to be moved in the axial direction along the shaft 231, a disk-shaped stopper 237a disposed with a predetermined clearance from the movement member 236a, and a second biasing member 238a constituted of a compression coil spring disposed between the movement member 236a and the stopper 237a. Similarly, the regulation member 235b includes the movement member 236b that is disposed between the shaft 231 and the outer peripheral bodies 232 to be moved in the axial direction along the shaft 231, a disk-shaped stopper 237b disposed with a predetermined clearance from the movement member 236b, and a second biasing member 238b constituted of a compression coil spring disposed between the movement member 236b and the stopper 237b.

The movement members 236a and 236b are formed in the shape of a truncated cone, in the central portion of which a through hole is formed. That is, the outer peripheral surfaces (side surfaces of the truncated cones) of the movement members 236a and 236b correspond to the inclined surfaces 236c that are inclined with respect to the axial direction. The inclined surfaces 236c slide with respect to the sliding surfaces 232a of the outer peripheral bodies 232. As discussed later, the outer peripheral surface 230a can be easily changed into the winding shape and the separable shape by the movement device 130 moving the movement members 236a and 236b in the axial direction.

The stoppers 237a and 237b are attached at predetermined positions of the shaft 231. The stoppers 237a and 237b are configured to be movable in the axial direction by stopper movement mechanisms 190 that are provided in the drive units 110a and 110b. The biasing forces of the pair of second biasing members 238a and 238b are changed by moving the stoppers 237a and 237b in the axial direction, since the clearance between the stoppers 237a and 237b and the movement members 236a and 236b is varied. The second biasing members 238a and 238b bias the movement members 236a and 236b in the direction of moving closer to each other along the axial direction of the mandrel 230 with the first biasing members 225 biasing the outer peripheral bodies 232. In the present embodiment, the stopper movement mechanisms 190 are an example of the "deformation device" according to the present disclosure.

In the present embodiment, when the stopper movement mechanisms 190 move the stoppers 237a and 237b in the direction of approaching each other from the position indicated in the first illustration of FIG. 14, for example, the clearance between the stoppers 237a and 237b and the movement members 236a and 236b is reduced, and the biasing forces of the second biasing members 238a and 238b are increased. Consequently, the movement members 236a and 236b are moved so as to approach each other, and the sliding surfaces 232a of the outer peripheral bodies 232 are moved toward the radially outer side against the biasing forces of the first biasing members 225 while sliding with respect to the inclined surfaces 236c of the movement members 236a and 236b. At this time, the movement members 236a and 236b are disposed at the position (predetermined position) indicated in the second illustration of FIG. 14 and regulate movement of the outer peripheral surface 230a toward the radially inner side, and the outer peripheral surface 230a tightly contacts the inner peripheral surface of the sleeve 229 and is brought into the winding shape.

When the stopper movement mechanisms 190 move the stoppers 237a and 237b in the direction of moving away from each other from the position indicated in the second illustration of FIG. 14, meanwhile, the clearance between the stoppers 237a and 237b and the movement members 236a and 236b is increased, and the biasing forces of the second biasing members 238a and 238b are reduced. At this time, the first biasing members 225 bias the outer peripheral bodies 232 such that the outer peripheral surface 230a is displaced toward the radially inner side. Thus, the sliding surfaces 232a of the outer peripheral bodies 232 are moved toward the radially inner side by the biasing forces of the first biasing members 225 while sliding with respect to the inclined surfaces 236c of the movement members 236a and 236b, by the stopper movement mechanisms 190 moving the movement members 236a and 236b away from each other. At this time, the outer peripheral surface 230a is moved apart from the inner peripheral surface of the sleeve 229, and brought into the separable shape.

As discussed later, the second biasing members 238a and 238b bias the movement members 236a and 236b such that the second biasing members 238a and 238b are compressively elastically deformable along the axial direction of the mandrel 230 by a winding tightening force of the fiber bundle F generated when the fiber bundle F is wound around the mandrel 230, that is, with a biasing force due to the winding tightening force that enables the outer peripheral surface 230a to be displaced toward the radially inner side. Therefore, as discussed later, when the fiber bundle F is wound around the mandrel 230, the outer peripheral surface 230a is displaced toward the radially inner side by the winding tightening force, and the movement members 236a and 236b are moved in the direction away from each other.

In the present embodiment, in step S21, the outer peripheral body 232 is moved toward the radially outer side to tightly contact the sleeve 229, by moving the stoppers 237a and 237b from the first position (a position relatively far from the mandrel 230, or the position indicated in the first illustration of FIG. 14) to the second position (a position relatively close to the mandrel 230, or the position indicated in the second illustration of FIG. 14) with the outer peripheral bodies 232 combined (the state in the first illustration of FIG. 13 and the first illustration of FIG. 14). Then, as illustrated in the second illustration of FIG. 13 and the third illustration of FIG. 14, the tubular body 21a is formed on the outer peripheral surface of the sleeve 229 that covers the outer peripheral surface 230a of the mandrel 230. At this time, the fiber bundle F that is impregnated with a resin is wound with a predetermined tension applied thereto, and therefore the outer peripheral surface 230a is displaced slightly (e.g. by less than one millimeter) toward the radially inner side by a winding tightening force due to the fiber bundle F.

After that, in step S22, hot air is blown toward the tubular body 21a to cure the uncured fiber-reinforced resin to form the tubular member 21.

Here, as illustrated in FIG. 15, the resin R that constitutes the tubular body 21a is temporarily softened by heat when hot air is blown to cure the resin R. At this time, the fiber bundle F is wound with a tension applied thereto, and therefore moved toward the radially inner side (toward the mandrel 230) in the resin R as the resin R is softened. Consequently, the fiber bundle F is occasionally loosened with the tension of the fiber bundle F reduced.

In the present embodiment, however, the second biasing members 238a and 238b bias the movement members 236a and 236b such that the second biasing members 238a and 238b are compressively elastically deformable along the axial direction of the mandrel 230 by the winding tightening force of the fiber bundle F. That is, the outer peripheral surface 230a is displaced toward the radially inner side when the fiber bundle F is wound around the mandrel 230. Since a biasing force in the direction of moving closer to the second biasing members 238a and 238b acts on the movement members 236a and 236b, a force toward the radially outer side acts on the outer peripheral bodies 232. Therefore, the outer peripheral bodies 232 are displaced toward the radially outer side by an amount corresponding to the reduction in the tension of the fiber bundle F, that is, by an amount corresponding to movement of the fiber bundle F toward the radially inner side, as the resin R is softened. Consequently, loosening of the fiber bundle F due to the reduction in the tension of the fiber bundle F is suppressed, and thus a reduction in the strength of the tubular member 21 can be suppressed.

Then, in step S23, as illustrated in the fourth illustration of FIG. 14, the outer peripheral bodies 232 are moved toward the radially inner side by the function of the first biasing members 225, by moving the stoppers 237a and 237b from the second position to the first position. Consequently, the outer peripheral bodies 232 are moved apart from the inner peripheral surface of the sleeve 229, and the outer peripheral surface 230a is brought into the separable shape.

After that, in step S24, as illustrated in the fifth illustration of FIG. 14, the tubular member 21 and the mandrel 230 are separated from each other in the axial direction by moving the mandrel 230 (the shaft 231, the outer peripheral bodies 232, and the regulation members 235a and 235b) in the axial direction. In this state, the sleeve 229 tightly contacts the inner peripheral surface 21c of the tubular member 21. Therefore, as in the third embodiment described above, the sleeve 229 is extracted after being moved apart from the tubular member 21 using the sleeve extraction mechanism 400. The tubular member formation step S2 is ended in this manner.

The other structure, manufacturing method, and effect of the fourth embodiment are the same as those of the third embodiment described above.

The embodiments disclosed herein should be considered as exemplary in all respects and not limiting. The scope of the present disclosure is not limited to the embodiments described above.

For example, while the liner is formed after forming the reinforcement body and the outside reinforcement layer in the embodiments described above, the present disclosure is not limited thereto. For example, the reinforcement body and the outside reinforcement layer may be provided to cover a liner (not illustrated) made of a resin and formed in advance when combining the peripheral edge portions at both ends of the tubular member and the peripheral edge portions of the dome members in the joint step. In this case, the liner formation step is not performed. The liner can be formed by a known manufacturing method, and the strength of the liner may not be high since a fiber bundle is not wound around the outer surface of the liner using the FW method. Therefore, the thickness of the liner can be reduced compared to that of a conventional liner. The liner may be formed from a metal material such as an aluminum alloy in place of a resin material.

While the sleeve is provided on the outer peripheral surface of the mandrel and the tubular body is formed on the sleeve in the third and fourth embodiments described above, for example, the present disclosure is not limited thereto. The sleeve may be provided on the outer peripheral surface of the mandrel in the first and second embodiments described above, and the sleeve may not be provided on the outer peripheral surface of the mandrel in the third and fourth embodiments described above.

While the movement members are biased toward the outer peripheral bodies using the second biasing members in the fourth embodiment described above, for example, the present disclosure is not limited thereto. For example, the movement members may be pressed toward the outer peripheral bodies using a hydraulic mechanism etc. The positions of the movement members may be changed using a holding mechanism that holds the movement members. In any case, the outer peripheral surface of the mandrel can be displaced toward the radially outer side in step S22.

While the sleeve tightly contacts the tubular member when the outer peripheral surface of the mandrel is changed from the winding shape to the separable shape in the third and fourth embodiments described above, for example, the present disclosure is not limited thereto. For example, the tightness in contact between the sleeve and the tubular member may be reduced by applying a parting agent to the outer peripheral surface of the sleeve, applying chrome plating, or applying a surface treatment such that minute bumps and pits are formed. With such a configuration, the sleeve can be moved apart (peeled) from the inner peripheral surface of the tubular member when the outer peripheral surface of the mandrel is changed from the winding shape to the separable shape. In this case, the sleeve is supported on the outer peripheral surface of the mandrel, and thus the sleeve can be extracted at the same time by extracting the mandrel in the axial direction.

While the outer peripheral bodies are moved in the radial direction using the movement members in the fourth embodiment described above, for example, the present disclosure is not limited thereto. For example, the outer peripheral bodies may be moved in the radial direction by providing a bag-shaped member made of elastically deformable heat-resistant rubber etc. between the outer peripheral bodies and the shaft, charging a liquid such as oil inside the bag-shaped member, and swelling and shrinking the bag-shaped member using a hydraulic (fluid-pressure) mechanism.

While the heating device is used as the solidification device in the embodiments described above, the present disclosure is not limited thereto. For example, when a thermoplastic resin is used as the resin with which the fiber bundle is impregnated, the fiber bundle is wound around the mandrel with the resin softened. In this case, an air blowing device that blows cooling air may be used as the solidification device that solidifies the resin.

What is claimed is:

1. A manufacturing device for a tubular member corresponding to a reinforcement layer of a body portion of a high-pressure tank configured to house a gas, the manufacturing device manufacturing the tubular member from a fiber-reinforced resin and comprising:
   a mandrel that extends along a predetermined axis;
   a rotation device configured to hold an end portion of the mandrel and rotate the mandrel about the predetermined axis;
   a fiber supply device configured to supply a fiber bundle that is impregnated with a resin such that the fiber bundle is wound around the mandrel that is rotated by the rotation device; and
   a solidification device configured to shape the tubular member by solidifying the resin with which the fiber bundle wound around the mandrel is impregnated, wherein:
   the mandrel has at least one outer peripheral member that shapes an outer peripheral surface of the mandrel and that makes the outer peripheral surface freely deformable, and a regulation member that regulates movement of the outer peripheral surface toward a radially inner side; and
   the manufacturing device further comprises
      a deformation device configured to actuate the regulation member to deform the outer peripheral surface of the mandrel into the outer peripheral surface in a winding shape, the winding shape allowing winding of the fiber bundle, and the outer peripheral surface in a separable shape, the separable shape being obtained by moving the outer peripheral surface in the winding shape toward the radially inner side and allowing the mandrel and the tubular member to be separated in an axial direction of the mandrel, and
      a separation device configured to separate, in the axial direction, the tubular member and the mandrel having the outer peripheral surface that has been deformed to be in the separable shape.

2. The manufacturing device according to claim 1, wherein:

the outer peripheral member is a cylindrical body in which a slit that extends in the axial direction is provided;

the regulation member is a shim that is able to be inserted into and extracted from the slit;

the shim regulates the movement of the outer peripheral surface toward the radially inner side and the outer peripheral surface is in the winding shape when the shim is inserted in the slit by the deformation device; and the outer peripheral surface is in the separable shape when the shim is extracted from the slit by the deformation device.

3. The manufacturing device according to claim 1, wherein:

the regulation member is a core material that extends in the axial direction;

the outer peripheral member includes a plurality of outer peripheral bodies disposed around the core material to shape the outer peripheral surface;

the core material is shaped to be able to be inserted into and extracted from a space provided inside by combining the outer peripheral bodies; and the core material regulates the movement of the outer peripheral surface toward the radially inner side and the outer peripheral surface is in the winding shape when the core material is inserted in the space by the deformation device, and the outer peripheral surface is in the separable shape when the core material is extracted from the space by the deformation device.

4. The manufacturing according to claim 1, wherein:

the mandrel further has a shaft that extends in the axial direction;

the outer peripheral member includes a plurality of outer peripheral bodies disposed around the shaft to shape the outer peripheral surface;

each of a pair of the regulation members is provided on each of both sides of the outer peripheral bodies in the axial direction;

the regulation members each include a movement member disposed between the shaft and the outer peripheral bodies to move in the axial direction along the shaft;

the movement member has an inclined surface inclined with respect to the axial direction;

the outer peripheral bodies have a sliding surface that is inclined with respect to the axial direction and that slides with respect to the inclined surface of the movement member;

the outer peripheral member is provided with a first biasing member that biases the outer peripheral bodies such that the outer peripheral surface is displaced toward the radially inner side with the inclined surface of the movement member in abutment with the sliding surface;

a pair of the movement members regulates the movement of the outer peripheral surface toward the radially inner side and the outer peripheral surface is in the winding shape when the movement members are disposed at a predetermined position along the axial direction of the mandrel by the deformation device; and the outer peripheral surface is in the separable shape when the movement members are moved from the predetermined position away from each other along the axial direction of the mandrel by the deformation device.

5. The manufacturing device according to claim 4, wherein:

the regulation members further include a second biasing member that biases the movement members in a direction of moving closer to each other along the axial direction of the mandrel when the first biasing member biases the outer peripheral bodies; and the second biasing member is configured to bias the movement members such that the second biasing member is compressively elastically deformable along the axial direction of the mandrel by a winding tightening force of the fiber bundle generated when the fiber bundle is wound around the mandrel.

6. The manufacturing device according to claim 3, wherein:

a gap is provided between the outer peripheral bodies when the outer peripheral surface is in the winding shape; and a sleeve to which the fiber bundle is supplied from the fiber supply device is provided so as to cover the outer peripheral surface of the mandrel.

* * * * *